United States Patent
Chen et al.

(10) Patent No.: US 10,104,530 B2
(45) Date of Patent: Oct. 16, 2018

(54) INFORMATION QUERY METHOD, DEVICE, AND SYSTEM

(71) Applicant: Huawei Device (Dongguan) Co., Ltd., Dongguan (CN)

(72) Inventors: Ji Chen, Shenzhen (CN); Zhiming Ding, Shenzhen (CN); Zhenguo Du, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 122 days.

(21) Appl. No.: 14/889,783

(22) PCT Filed: May 8, 2013

(86) PCT No.: PCT/CN2013/075338
§ 371 (c)(1),
(2) Date: Nov. 6, 2015

(87) PCT Pub. No.: WO2014/179952
PCT Pub. Date: Nov. 13, 2014

(65) Prior Publication Data
US 2016/0112859 A1  Apr. 21, 2016

(51) Int. Cl.
*H04W 8/00* (2009.01)
*H04W 76/10* (2018.01)
(Continued)

(52) U.S. Cl.
CPC ........... *H04W 8/005* (2013.01); *H04W 76/10* (2018.02); *H04L 67/16* (2013.01); *H04W 84/12* (2013.01)

(58) Field of Classification Search
CPC .................................................... H04W 8/005
See application file for complete search history.

(56) References Cited

U.S. PATENT DOCUMENTS

2010/0235525 A1   9/2010  Mcguire et al.
2011/0153773 A1   6/2011  Vandwalle et al.
(Continued)

FOREIGN PATENT DOCUMENTS

CN        1859184 A     11/2006
CN      101489304 B     12/2010
(Continued)

OTHER PUBLICATIONS

Foreign Communication From a Counterpart Application, PCT Application No. PCT/CN2013/075338, English Translation of International Search Report dated Feb. 20, 2014, 2 pages.
(Continued)

*Primary Examiner* — Huy D Vu
*Assistant Examiner* — Kevin Cunningham
(74) *Attorney, Agent, or Firm* — Conley Rose, P.C.

(57) ABSTRACT

An information query method, including sending, by a first device, a data-excluded information query request frame, where the data-excluded information query request frame includes first control information and a first hash value; receiving, by the first device, a data-excluded information query response frame sent by a second device. The data-excluded information query response frame includes second control information, a second hash value, and an address of the second device. The method also includes sending, by the first device, a data-contained information query request frame to the second device when the first device determines that a third hash value is consistent with the second hash value, so that the second device responds to the data-contained information query request frame when receiving the data-contained information query request frame. Correspondingly, the present disclosure further provides a related device.

18 Claims, 7 Drawing Sheets

(51) Int. Cl.
*H04W 84/12* (2009.01)
*H04L 29/08* (2006.01)

(56) References Cited

U.S. PATENT DOCUMENTS

| | | | |
|---|---|---|---|
| 2013/0215751 A1* | 8/2013 | Tetzlaff | H04W 28/065 370/235 |
| 2014/0112301 A1 | 4/2014 | Shu et al. | |
| 2014/0258395 A1* | 9/2014 | Tng | H04L 67/16 709/204 |
| 2014/0293978 A1 | 10/2014 | Yang et al. | |
| 2015/0139207 A1* | 5/2015 | Seok | H04W 48/14 370/338 |
| 2016/0057605 A1* | 2/2016 | Shellhammer | H04W 8/005 370/311 |

FOREIGN PATENT DOCUMENTS

| | | |
|---|---|---|
| CN | 102597982 A | 7/2012 |
| CN | 102883404 A | 1/2013 |
| CN | 103001816 A | 3/2013 |
| EP | 2858326 A1 | 4/2015 |
| WO | 2011087640 A1 | 7/2011 |

OTHER PUBLICATIONS

Foreign Communication From a Counterpart Application, PCT Application No. PCT/CN2013/075338, English Translation of Written Opinion dated Feb. 20, 2014, 6 pages.

Foreign Communication From a Counterpart Application, European Application No. 13883930.3, Extended European Search Report dated Mar. 23, 2016, 5 pages.

Machine Translation and Abstract of Chinese Publication No. CN1859184, Nov. 8, 2006, 11 pages.

Machine Translation and Abstract of Chinese Publication No. CN103001816, Mar. 27, 2013, 15 pages.

Foreign Communication From a Counterpart Application, Chinese Application No. 201380000836.5, Chinese Office Action dated Aug. 3, 2018, 5 pages.

* cited by examiner

| First control information | Type | Subtype | 0 | 0 | First hash value | Reserved | Verification code |

3-1

| First control information | Type | Subtype | 1 | 0 | First hash value | Reserved | Verification code |

| Second control information | Type | Subtype | 0 | 1 | Second hash value | Reserved | Verification code |

4-1

| Second control information | Type | Subtype | 1 | 0 | Second hash value | Reserved | Verification code |

0001 indicates a request type
0010 indicates a publication type
0011 indicates neutral cutting

| Control information | Type | Subtype | Hash value | Reserved | Verification code |

FIG. 5

| First control information | Type | 0001 | First hash value | Reserved | Verification code |

6-1

| First control information | Type | 0011 | First hash value | Reserved | Verification code |

| Second control information | Type | 0001 | Second hash value | Reserved | Verification code |

7-1

| Second control information | Type | 0011 | Second hash value | Reserved | Verification code |

INFORMATION QUERY METHOD, DEVICE, AND SYSTEM

CROSS-REFERENCE TO RELATED APPLICATIONS

This application is a National Stage of International Application No. PCT/CN2013/075338, filed on May 8, 2013, which is hereby incorporated by reference in its entirety.

TECHNICAL FIELD

The present disclosure relates to the communications field, and in particular, to an information query method, a device, and a system.

BACKGROUND

Currently, Wireless Fidelity (WiFi) networks are widely applied, and currently, lots of communications devices. For example, communications devices such as a mobile phone, a computer, and a tablet computer, all support a WiFi technology. That is, these communications devices can perform network communication using a WiFi network. In addition, currently, WiFi networks are spread all over public places or private places. For example, a hotel, a school, a hospital, a house, and other places. When performing communication using a WiFi network, communications devices all perform communication using a frame in the WiFi network. That is. For information transfer between the communications devices, information is borne on the frame in the WiFi network, and then the information transfer is completed using the frame in the WiFi network. Information query means that a device (for example, a device A) intends to learn whether information matching a demand of the device exists in the surroundings. If a device (for example, a device B) that has information matching the demand exists in the surroundings, the device B may notify the device A that the device B has the matching information. For a WiFi network, in a query process, the two devices may interact using a WiFi frame.

Currently, the structure of a frame in a WiFi network is defined in an excessively complex manner, and in some cases, there is too much redundant information in the frame in the WiFi network. For example, a frame header in the structure of a probe request frame or a probe response frame includes a frame control field (Frame Control), a duration/identifier field (Duration/ID), an address field (Address), a sequence control field (Sequence), and the like, and the frame header occupies 28 bytes. If there is a little content to be queried for, the probe request frame and the probe response frame carry a little information, which may be one or more names or addresses. In these cases, a frame body may possibly occupy only several bytes and the frame body is a part that carries information. That is. For such a probe request frame or probe response frame, only several bytes are used for carrying information, and the other bytes may be understood as redundant information. As a result, there is much redundancy in a frame for transmission, and there is a little information that really matters, so that many network resources are occupied for query, leading to low utilization of the network resources.

SUMMARY

Embodiments of the present disclosure provide an information query method, a device, and a system, which can improve utilization of network resources.

According to a first aspect, the first embodiment of the present disclosure provides an information query method, including sending, by a first device, a data-excluded information query request frame, where the data-excluded information query request frame includes first control information and a first hash value. The first hash value is a hash value generated after first information is computed using a first hash function, and the data-excluded information query request frame does not include a target address. The first control information includes at least first indication information used for indicating a type of the data-excluded information query request frame. The method also includes receiving, by the first device, a data-excluded information query response frame sent by a second device, where the data-excluded information query response frame includes second control information, a second hash value, and an address of the second device. The second hash value is a hash value generated after the second device computes second information using a second hash function, and the data-excluded information query response frame does not include a target address. The second control information includes at least second indication information used for indicating the type of the data-excluded information query request frame. The method also includes sending, by the first device, a data-contained information query request frame to the second device when the first device determines that a third hash value is consistent with the second hash value, where the third hash value is a hash value generated after the first information is computed using the second hash function. The data-contained information query request frame includes the address of the second device and an address of the first device, so that the second device responds to the data-contained information query request frame when receiving the data-contained information query request frame.

According to a second aspect, the first embodiment of the present disclosure provides an information query method, including acquiring, by a second device, a data-excluded information query request frame sent by a first device and including first control information and a first hash value. The first hash value is a hash value generated after first information is computed using a first hash function. The data-excluded information query request frame does not include a target address, and the first control information includes at least first indication information used for indicating a type of the data-excluded information query request frame. The method also includes sending, by the second device, a data-excluded information query response frame when the second device has second information corresponding to the first hash value. The data-excluded information query response frame includes second control information, a second hash value, and an address of the second device, so that the first device sends a data-contained information query request frame to the second device when the first device determines that a third hash value is consistent with the second hash value. The third hash value is a hash value generated after the first device computes the first information using the second hash function. The data-contained information query request frame includes the address of the second device and an address of the first device, and the second hash value is a hash value generated after the second device computes the second information using the second hash function. The data-excluded information query response frame does not include a target address, and the second control information includes at least second indication information used for indicating the type of the data-excluded information query request frame. The method also includes responding, by the second device, to the data-contained information query request frame when receiving the data-contained information query request frame.

According to a fifth aspect, an embodiment of the present disclosure provides a communications device, including a transmitter, a receiver, and a processor separately coupled with the transmitter and the receiver, where the transmitter is configured to send a data-excluded information query request frame. The data-excluded information query request frame includes first control information and a first hash value, and the first hash value is a hash value generated after first information is computed using a first hash function. The data-excluded information query request frame does not include a target address, and the first control information includes at least first indication information used for indicating a type of the data-excluded information query request frame. The receiver is configured to receive a data-excluded information query response frame sent by a second device, where the data-excluded information query response frame includes second control information, a second hash value, and an address of the second device. The second hash value is a hash value generated after the second device computes second information using a second hash function, and the data-excluded information query response frame does not include a target address. The second control information includes at least second indication information used for indicating the type of the data-excluded information query request frame. The processor is configured to parse the data-excluded information query response frame received by the receiver, obtain the second hash value, and determine whether a third hash value is consistent with the second hash value. The third hash value is a hash value generated after the first information is computed using the second hash function. The transmitter is further configured to send a data-contained information query request frame to the second device when the processor determines that the third hash value is consistent with the second hash value. The data-contained information query request frame includes the address of the second device and an address of the communications device, so that the second device responds to the data-contained information query request frame when receiving the data-contained information query request frame.

According to a sixth aspect, an embodiment of the present disclosure provides a communications device, including a transmitter, a receiver, and a processor separately coupled with the transmitter and the receiver, where the receiver is configured to acquire a data-excluded information query request frame sent by a first device and including first control information and a first hash value. The first hash value is a hash value generated after first information is computed using a first hash function, and the data-excluded information query request frame does not include a target address. The first control information includes at least first indication information used for indicating a type of the data-excluded information query request frame. The processor is configured to parse the data-excluded information query request frame received by the receiver, obtain the first hash value, and determine whether the communications device has second information corresponding to the first hash value. The transmitter is configured to send a data-excluded information query response frame when the processor determines that the communications device has the second information corresponding to the first hash value. The data-excluded information query response frame includes second control information, a second hash value, and an address of the communications device, so that the first device sends a data-contained information query request frame to the communications device when the first device determines that a third hash value is consistent with the second hash value. The third hash value is a hash value generated after the first device computes the first information using the second hash function, and the data-contained information query request frame includes the address of the communications device and an address of the first device. The second hash value is a hash value generated after the processor computes the second information using the second hash function, and the data-excluded information query response frame does not include a target address. The second control information includes at least second indication information used for indicating the type of the data-excluded information query request frame. The processor is further configured to respond to the data-contained information query request frame when the data-contained information query request frame is received.

In the foregoing technical solutions, a data-excluded information query request frame includes only first control information and a first hash value, and a data-excluded information query response frame includes only second control information, a second hash value, and an address of a second device. When a first device acquires the data-excluded information query response frame, the first device sends a data-contained information query request frame to the second device when the first device determines that a third hash value is consistent with the second hash value. The data-contained information query request frame includes the address of the second device and an address of the first device, so that the second device responds to the data-contained information query request frame when receiving the data-contained information query request frame. In the embodiments of the present disclosure, the data-excluded information query request frame and the data-excluded information query response frame are shorter than a frame in the prior art, so that few network resources are occupied for a query, and utilization of the network resources is high.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 2 to FIG. 7 are schematic structural diagrams of optional data-excluded frames according to embodiments of the present disclosure;

DESCRIPTION OF EMBODIMENTS

Figure 1:
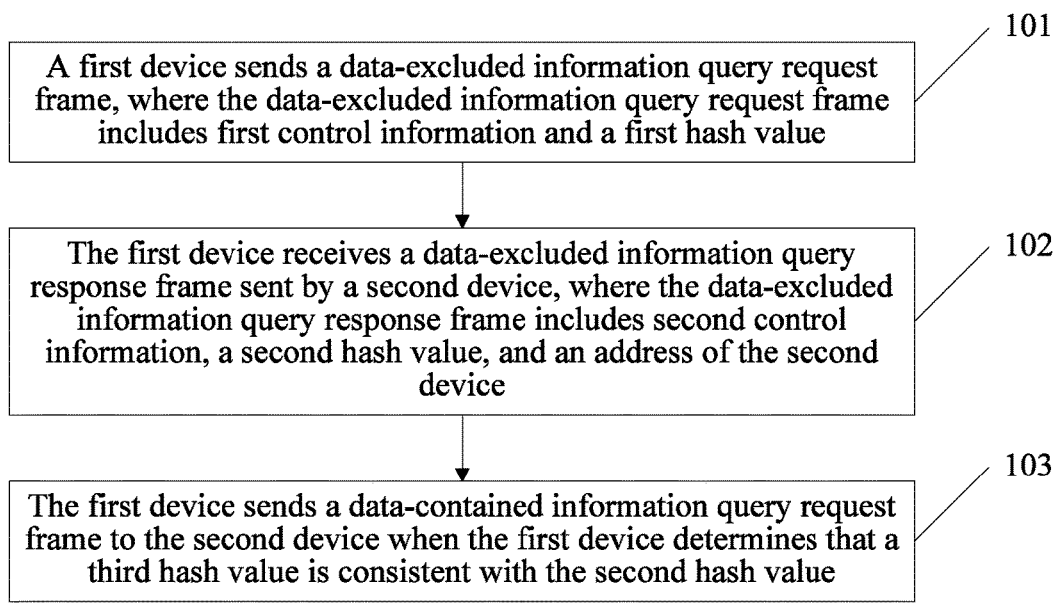
FIG. 1 is a schematic flowchart of an information query method according to an embodiment of the present disclosure.

The following clearly and describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, an address of a device may be a media access control (MAC) address of the device. In addition, in the embodiments of the present disclosure, the device may be any device in a communications network. For example, any communications device in a WiFi network. For example, a communications device such as a mobile phone, a computer, a tablet computer, or a printer. A first device may be any communications device in a communications network, and a second device may be any communications device in the communications network except the first device.

In the embodiments of the present disclosure, a data-excluded information query request frame is a frame having no frame body part and provided by the embodiments of the present disclosure, and is a data frame having only a frame header and verification code. In the embodiments of the present disclosure, content of the frame header of the data-excluded information query request frame is also defined. That is, a target address is not included. In the existing Institute of Electrical and Electronics Engineers (IEEE) 802.11 protocol of WiFi, a target address includes a receive address (RA) and a destination address (DA), where the RA indicates a next-hop receive address of a frame having the RA, and the DA indicates a final destination address of a frame having the DA. That the target address is not included, which is mentioned in the embodiments of the present disclosure, means that neither the RA nor the DA is included. In addition, the frame header of the data-excluded information query request frame includes a hash value and does not have an information element in another frame body defined in the existing IEEE 802.11 protocol. Also, the data-excluded information query request frame does not include a transmit address, where the transmit address may be a transmit address (TA). That is, an address of a device that sends the data-excluded information query request frame. For example, the transmit address may be an address of the first device or may be an address of a device that forwards the data-excluded information query request frame. Similarly, a data-excluded information query response frame is a frame having no frame body part and provided by the embodiments of the present disclosure, and is a data frame having only a frame header and verification code. In the embodiments of the present disclosure, content of the frame header of the data-excluded information query response frame is also defined. That is, a transmit address is included but a frame receive address is not included. Also, the data-excluded information query response frame does not include a transmit address, where the transmit address refers to an address of a device that forwards the data-excluded information query response frame. In addition, the frame header of the data-excluded information query response frame includes a hash value and does not have an information element in another frame body defined in the existing IEEE 802.11 protocol. While, an existing frame includes three parts: a frame header, a frame body, and verification code, or sometimes, some frames do not have a frame body. The data-excluded information query request frame and the data-excluded information query response frame that are provided by the embodiments of the present disclosure have a simple structure and can carry more information. For example, can carry more hash values. The data-excluded information query request frame and the data-excluded information query response frame may be MAC frames. Data-contained information query request frame is an existing management frame conforming to a definition in the 802.11 protocol, and these frames have both a receive address RA and a TA, and do not additionally carries a destination address DA or a source address (SA) because their DAs are equal to RAs, and SAs are equal to TAs.

In addition, in the embodiments of the present disclosure, first information may be information that the first device needs to query. For example, information about a service, a user identifier, a service, a program, or a game. Information supported by the first device refers to that the first device supports a function, a service, or a program described in the information. For example, if the information is color printing v2.0, it indicates that the first device supports color printing of a v2.0 version. In the embodiments of the present disclosure, second information may be any information supported by the second device. For example, information about a service, a user identifier, a service, a program, or a game. Information supported by the second device refers to that the first device supports a function, a service, or a program described in the information.

FIG. 1 is a schematic flowchart of an information query method according to an embodiment of the present disclosure. As shown in FIG. 1, the method includes:

101: A first device sends a data-excluded information query request frame, where the data-excluded information query request frame includes first control information and a first hash value. The first hash value is a hash value generated after first information is computed using a first hash function, and the data-excluded information query request frame does not include a target address. The first control information includes at least first indication information used for indicating a type of the data-excluded information query request frame.

The data-excluded information query request frame includes only the first control information and the first hash value, and does not include a target address. In this way, the data-excluded query request frame may have more bytes for carrying content information. For example, more bytes are used for carrying a hash value and may carry multiple first hash values.

That the data-excluded information query request frame does not include a target address may refer to that the data-excluded information query request frame does not include an address of a device acquiring the data-excluded information query request frame. The device acquiring the data-excluded information query request frame may include the foregoing second device, and the device acquiring the data-excluded information query request frame may further include another device in a network except the foregoing second device. In this way, when the first device sends the data-excluded information query request frame, there is no specific receiving device. That is, the first device only needs to be responsible for sending the data-excluded information query request frame, and the first device does not need to consider which device acquires the data-excluded information query request frame.

102: The first device receives a data-excluded information query response frame sent by a second device, where the data-excluded information query response frame includes second control information, a second hash value, and an address of the second device. The second hash value is a hash value generated after the second device computes second information using a second hash function, the data-excluded information query response frame does not include a target address, and the second control information includes at least second indication information used for indicating the type of the data-excluded information query request frame.

The second device may, in real time, listen to whether a data-excluded information query request frame is transmitted in the network, or periodically listen to whether a data-excluded information query request frame is transmitted in the network. When it is detected that a data-excluded information query request frame is transmitted in the network, the data-excluded information query request frame is acquired, and the acquired data-excluded information query response frame is parsed, to acquire a first hash value included in the data-excluded information query request frame. When the second device determines, according to the first hash value. That the second device has second information corresponding to the first hash value, the second device sends the data-excluded information query response frame. That the data-excluded information query response frame does not include a target address may refer to that the data-excluded information query response frame does not include an address of a device acquiring the data-excluded information query response frame. The device acquiring the data-excluded information query response frame may include the foregoing first device, and the device acquiring the data-excluded information query response frame may further include another device in the network except the foregoing first device.

The second hash value may be a hash value generated by the second device in advance. Alternatively, the second hash value may be a hash value generated after the second device computes the second information using the second hash function when the second device determines, according to the first hash value. That the second device has the second information corresponding to the first hash value.

103: The first device sends a data-contained information query request frame to the second device when the first device determines that a third hash value is consistent with the second hash value, where the third hash value is a hash value generated after the first information is computed using the second hash function. The data-contained information query request frame includes the address of the second device and an address of the first device, so that the second device responds to the data-contained information query request frame when receiving the data-contained information query request frame.

The data-contained information query request frame is a frame including a frame header, a frame body, and verification code, and for the frame, refer to a MAC frame in the prior art.

When the first device determines that the third hash value is consistent with the second hash value, it indicates that the second device is a device that the first device needs to query. For example, the second device provides a service needed by the first device, such as, printing. For example, the second device is a device for which the first device needs to search. For example, the second device and the first device conduct a service at the same time, and for example, the second device and the first device run a game at the same time. For example, the second device and the first device log in using a same user identifier at the same time. The first device may send the data-contained information query request frame to the second device, where the data-contained information query request frame includes the address of the second device and the address of the first device, so that the second device responds to the data-contained information query request frame when receiving the data-contained information query request frame.

As an optional implementation manner, the first hash function may include performing hash computation on the first information, and using N bits of a hash result of the computation as a hash value, where N is a natural number, and locations of the N bits in the result of the hash computation are not limited. That is, the first device performs hash computation on the first information, and uses N bits of the hash result of the hash computation as the first hash value. For example, the hash result is of 128 bits, and the first hash value is the last bit to the $32^{nd}$ bit from the bottom of the 128-bit hash value, or is the $33^{rd}$ bit from the bottom to the $64^{th}$ bit from the bottom of the 128-bit hash value.

The second hash function may include performing hash computation on the second information, and using W bits of a hash result of the computation as a hash value, where W is a natural number, and locations of the W bits in the result of the hash computation are not limited. That is, the second device performs hash computation on the second information, and uses W bits of the hash result of the hash computation as the first hash value. For example, the hash result is of 128 bits, and the second hash value is the last bit to the $32^{nd}$ bit from the bottom of the 128-bit hash value, or is the $33^{rd}$ bit from the bottom to the $64^{th}$ bit from the bottom of the 128-bit hash value.

The hash computation may be any one of the following items: a message digest 5 (MD5) algorithm, a secure hash algorithm (SHA)1, an SHA256, an SHA512, and the like. A hash algorithm used in the hash computation in the first hash function may be different from a hash algorithm used in the hash computation in the second hash function.

As an optional implementation manner, the data-excluded information query response frame includes multiple second hash values. That is, the second device has multiple pieces of second information. In addition, determining, by the first device. That a third hash value is consistent with the second hash value may include determining that the third hash value is consistent with at least one second hash value in the multiple second hash values.

When the second device has multiple pieces of second information, the data-excluded information query response frame may include multiple second hash values, and a quantity of bits of the second hash value may be in direct proportion to a quantity of the second information that the second device has. For example, when the second device has two pieces of second information, each of the two second hash values may be of 48 bits, when the second device has three pieces of second information, each of the three second hash values may be of 64 bits, and the like. A quantity of the bits of the second hash value increases; therefore, the first device can be prevented from selecting wrong second information. For example, the second device has two pieces of second information, and values of hash results of the two pieces of information are stored in different places. For example, when first hash values both are the last bits to the $32^{nd}$ bits from the bottom of the two hash results, the $33^{rd}$ bits from the bottom to the $18^{th}$ bits from the bottom of the two hash results are different. In this way, two second hash values generated by the second device are different, so that the first device selects second information consistent with the first information from the two pieces of second information when acquiring the two second hash values.

As an optional implementation manner, the second hash value may further include the first hash value. That is, the first hash value is a part or all of the second hash value. For example, if a hash result obtained by performing hash computation on the first information is of 128 bits, the first hash value is the last bit to the $32^{nd}$ bit from the bottom of the hash value of 128 bits. The second information is consistent with the first information. That is, the hash result obtained by performing hash computation on the first information is the same as a hash result obtained by performing hash computation on the second information. In addition, the second hash value is the last bit to the $48^{th}$ bit from the bottom of the hash result obtained by performing hash computation on the second information.

As an optional implementation manner, the first hash function is the same as the second hash function. In this way, when the third hash value is consistent with the second hash value. That is, the hash result obtained by performing hash computation on the first information is the same as the hash result obtained by performing hash computation on the second information, and the first hash value is the same as the second hash value.

As an optional implementation manner, the second information refers to information whose hash value generated after the information is computed using the first hash function is consistent with the first hash value. The second device may compute, using the second hash function, information that the second device has, and when a computation result is consistent with the first hash value, it indicates that the information is the second information. Certainly, the information that the second device has may be computed using the second hash function in advance, or may be computed using the second hash function when the second device receives the first hash value. The second information may also refer to information of which the hash result includes the first hash value. That is, after hash computation is performed on the information, the hash result of the computation includes the first hash value.

As an optional implementation manner, the data-excluded information query request frame may not include a transmit address. That is, not include the address of the first device. In this way, when the second device acquires the data-excluded information query request frame, the second device does not know which device sends the data-excluded information query request frame, and then, the second device sends the data-excluded information query response frame in a manner in which the first device sends the data-excluded information query request frame. In addition, the data-excluded information query request frame and the data-excluded information query response frame may not include a duration/identifier field or a sequence control field in a frame in the prior art. That is, in this embodiment, the data-excluded information query request frame may include only control information, a hash value, and verification code, and the data-excluded information query response frame includes only the first control information, the second hash value, the address of the second device, and verification code. In this way, in the data-excluded information query request frame, besides the first hash value, other information accounts for a small proportion, so that the utilization of wireless resources and query efficiency are improved. In addition, to further improve the query efficiency, in this embodiment, one data-excluded frame is not limited to carrying only one hash value and may carry multiple different hash values. For example, the data-excluded information query request frame may carry multiple first hash values, and in the data-excluded information query response frame, there may also be more bytes used for carrying second hash values. For example, the data-excluded information query response frame may carry multiple second hash values. Certainly, a quantity of second hash values carried in the data-excluded information query response frame is not necessarily the same as a quantity of data-excluded information query request frames. The data-excluded information query response frame may carry only a second hash value corresponding to one or more first hash values in the multiple first hash values carried in the data-excluded information query request frame. For one data-excluded information query request frame, the second device may reply with one or more data-excluded information query response frames, or multiple different second devices may reply with one or more data-excluded information query response frames corresponding to the second devices.

As an optional implementation manner, the first control information may include at least the first indication information used for indicating the type of the data-excluded information query request frame. The second device acquires the first indication information when acquiring the data-excluded information query request frame. In this way, when responding to the data-excluded information query request frame, the second device may also respond to the data-excluded information query request frame using the data-excluded information query response frame. That is, the second device sends the data-excluded information query response frame. That is, the second control information includes at least the second indication information used for indicating the type of the data-excluded information query response frame.

The type of the data-excluded information query request frame may include a request type and a neutral type, and the type of the data-excluded information query response frame may include a publication type and a neutral type. When the type of the data-excluded information query request frame is a request type, the first hash value may indicate searching for the first information. For example, if the first information is information about a target, the first hash value is used for indicating searching for the target. That is, when the second device acquires that the type of the data-excluded information query request frame is a request type, the second device understands the first hash value as that the first device searches for the first information. For example, when the first information is information about a service, the first hash value indicates searching for the service, or when the first information is information about a user identifier, the first hash value indicates searching for the user identifier, or when the first information is information about a service, the first hash value indicates searching for the service. When the type of the data-excluded information query request frame is a request type, the type of the data-excluded information query response frame is a publication type, and the second hash value may indicate publishing the second information. For example, the second information may also be information about a target, so that the second hash value is used for indicating publishing the target. That is, when the first device acquires that the type of the data-excluded information query response frame is a request type, the first device understands the second hash value as that the second device publishes the second information. For example, when the second information is information about a service, the second hash value indicates publishing the service, or when the second information is information about a user identifier, the second hash value indicates publishing the user identifier, or when the second information is information about a service, the second hash value indicates publishing the service.

When the type of the data-excluded information query request frame is a neutral type, the first hash value may indicate that the first hash value matches the first information. For example, when the first information is information about a target, the first hash value may indicate that the first hash value matches the target. For example, when the first information is information about a game, the first hash value indicates that the first hash value matches the game. For example, when the first information is information about a service, the first hash value indicates that the first hash value is used for matching the service. When the type of the data-excluded information query request frame is a neutral type, the type of the data-excluded information query response frame is a neutral type. That is, the second hash value may indicate that the second hash value matches the second information. For example, when the second information is information about a target, the second hash value may indicate that the second hash value matches the target. For example, when the second information is information about a game, the second hash value indicates that the second hash value matches the game. Alternatively, when the second information is information about a service, the second hash value indicates that the second hash value matches the service. That is, a meaning indicated by the first hash value varies with a different type of the data-excluded information query request frame, and a meaning indicated by the second hash value varies with a different type of the data-excluded information query response frame.

For a data-excluded information query request frame of a request type, the data-excluded information query request frame may carry multiple first hash values at the same time, indicating that the data-excluded information query request frame is used for querying multiple pieces of information at the same time. For example, when the data-excluded information query request frame carries, at the same time, first hash values corresponding to services of a printer and a scanner, it indicates that the first device searches for services of the printer and the scanner at the same time. For a data-excluded information query request frame of a neutral type, the data-excluded information query request frame may carry, at the same time, first hash values of multiple pieces of information to be matched. For example, it may carry, at the same time, first hash values corresponding to a name of a game and a name of a friend, and may also carry first hash values of various combinations of request information, publication information, and neutral matching information at the same time. For example, it may carry a first hash value corresponding to a requested printer service and a first hash value corresponding to a to-be published scanner service at the same time. For a data-excluded information query response frame of a publication type or a neutral type, the data-excluded information query response frame may carry multiple second hash values at the same time. The one data-excluded information query response frame may respond only to one or several first hash values in multiple first hash values carried in the data-excluded information query request frame.

As an optional implementation manner, the data-excluded information query request frame may further carry third indication information used for indicating a property of the first hash value, where the third indication information may be placed before the first hash value. When there are multiple first hash values, there are multiple pieces of third indication information, each piece of third indication information is used for indicating a property of one first hash value, and each piece of third indication information is placed before a corresponding first hash value. The data-excluded information query response frame may also carry fourth indication information used for indicating a property of the second hash value, where the fourth indication information may be placed before the second hash value. When there are multiple second hash values, there are multiple pieces of fourth indication information, each piece of fourth indication information is used for indicating a property of one third hash value, and each piece of fourth indication information is placed before a corresponding second hash value. In an actual operation, generally, an integral multiple of 8 bits (that is, a length of one byte) is generally used for carrying one piece of content. For example, 32 bits or 48 bits may be used to indicate the first hash value and the second hash value. However, herein, when one piece of indication information needs to be added before a hash value, an optional method is to use 2 bits as the indication information, and a quantity of the other bits is used as a quantity of bits of the hash value. For example, 2 bits are used as the indication information, 30 bits are used as the first hash value, and there are 32 bits in total. For another example, 2 bits are used as the indication information, 46 bits are used as the second hash value, and there are 48 bits in total. The property of the first hash value may include a request property and a neutral property, and the property of the second hash value may include a publication property or a neutral property. For example, when the property of the first hash value is a request property, the first hash value may indicate searching for the first information. For example, the first information may be information about a target, so that the first hash value is used for indicating searching for the target. That is, when the second device acquires that the property of the first hash value is a request property, the second device understands the first hash value as that the first device searches for the first information. When the property of the first hash value is a request property, the property of the second hash value is a publication property, and the second hash value may indicate publishing the second information. When the property of the first hash value is a neutral property, the first hash value may indicate that the first hash value matches the first information. When the property of the first hash value is a neutral property, the property of the second hash value is a neutral property. That is, the second hash value may indicate that the second hash value matches the second information. That is, a meaning indicated by the first hash value varies with a different property of the first hash value, and a meaning indicated by the second hash value varies with a different property of the second hash value.

Optionally, the first indication information may include first type information and second type information. The first type information is used for indicating that the data-excluded information query request frame is a data-excluded frame, a type of the data-excluded frame may include a request type, a publication type, and a neutral type, and a property of a hash value of the data-excluded frame may include a request property, a publication property, and a neutral property. The second type information is used for indicating that the type of the data-excluded information query request frame is a request type or a neutral type. For example, a subtype (Subtype) field (a byte used for indicating a Subtype of a frame) in the first control information is the first type information. For example, the Subtype field in the first control information is 0001, and a type field (a byte used for indicating a Type of the frame) in the first control information is 00, and the other two bytes in the first control information are used for the second type information. For example, when the second type information is 00, it indicates that the type of the data-excluded information query request frame is a request type, and for example, when the second type information is 10, it indicates that the type of the data-excluded information query request frame is a neutral type.

Optionally, the second indication information may include third type information and fourth type information, where the third type information is used for indicating that the data-excluded information query response frame is a data-excluded frame. The fourth type information is used for indicating that the type of the data-excluded information query response frame is a publication type or a neutral type. For example, a Subtype field in the second control information is the third type information. For example, the Subtype field in the second control information is 0001, a Type field in the second control information is 00, and the other two bytes in the second control information are used for the fourth type information. For example, when the fourth type information is 01, it indicates that the type of the data-excluded information query response frame is a response type, and for example, when the fourth type information is 10, it indicates that the type of the data-excluded information query response frame is a neutral type.

Figure 2:
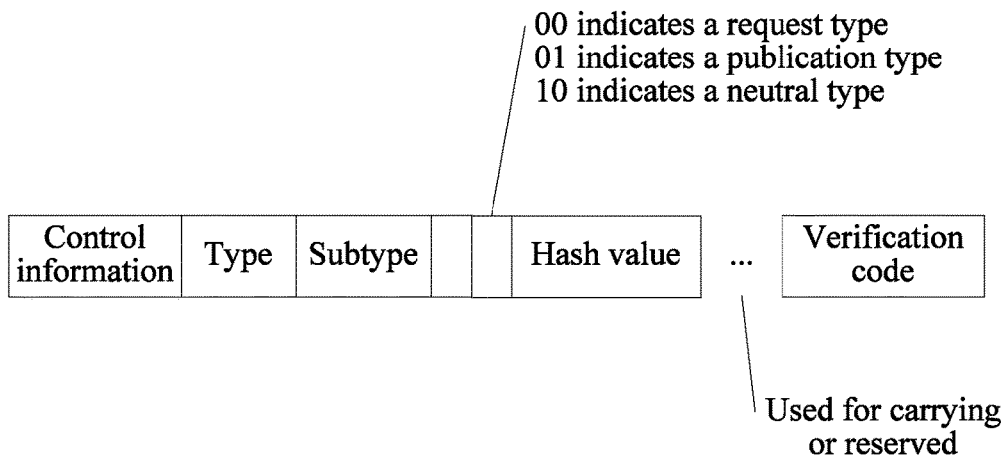

That is, this embodiment may provide a data-excluded frame, the format of the data-excluded frame is shown in FIG. 2, a Type field is 00, a Subtype field is 0001, used for indicating the data-excluded frame. The other two bytes may be 00, 01, or 10, indicating that a type of the data-excluded frame is a request type, a publication type, and a neutral type. The format of the data-excluded information query request frame is shown in FIG. 3, FIG. 3-1 indicates that the type of the data-excluded information query request frame is a request type, and "reserved" in FIG. 3-1 indicates that these bytes may be reserved for carrying other information and may also be used for carrying more data-excluded information query request frames. FIG. 3-2 indicates that the type of the data-excluded information query request frame is a neutral type, and "reserved" in FIG. 3-2 indicates that these byte may be reserved for carrying other information and may also be used for carrying more data-excluded information query request frames. The format of the data-excluded information query response frame is shown in FIG. 4, FIG. 4-1 indicates that the type of the data-excluded information query response frame is a publication type, and "reserved" in FIG. 4-1 indicates that these bytes may be reserved for carrying other information and may also be used for carrying more data-excluded information query response frames. FIG. 4-2 indicates that the type of the data-excluded information query response frame is a neutral type, and "reserved" in FIG. 4-2 indicates that these byte may be reserved for carrying other information and may also be used for carrying more data-excluded information query response frames.

Optionally, the first indication information may include fifth type information, where the fifth type information is used for indicating that the type of the data-excluded information query request frame is a request type or a neutral type. For example, a Subtype field in the first control information is the fifth type information. For example, when the Subtype field in the first control information is 0001, it indicates that the type of the data-excluded information query request frame is a request type. When the Subtype field in the first control information is 0011, it indicates that the type of the data-excluded information query request frame is a neutral type.

Optionally, the second indication information may include sixth type information, where the sixth type information is used for indicating that the type of the data-excluded information query response frame is a publication type or a neutral type. For example, a Subtype field in the first control information is the fifth type information. For example, when the Subtype field in the second control information is 0010, it indicates that the type of the data-excluded information query response frame is a publication type. When the Subtype field in the second control information is 0011, it indicates that the type of the data-excluded information query response frame is a neutral type.

That is, this embodiment may provide a data-excluded frame, the format of the data-excluded frame is shown in FIG. 5, and a Type field is 00, a Subtype field is 0001, 0010, or 0011, indicating that a type of the data-excluded frame is a request type, a publication type, and a neutral type. The format of the data-excluded information query request frame is shown in FIG. 6, FIG. 6-1 indicates that the type of the data-excluded information query request frame is a request type, and FIG. 6-2 indicates that the type of the data-excluded information query request frame is a neutral type. The format of the data-excluded information query response frame is shown in FIG. 7, FIG. 7-1 indicates that the type of the data-excluded information query request frame is a request type, and FIG. 7-2 indicates that the type of the data-excluded information query request frame is a neutral type.

As an optional implementation manner, the type of the data-excluded information query request frame or the property of the first hash value may be indicated using a length of the data-excluded information query request frame. Similarly, the type of the data-excluded information query response frame or the property of the second hash value may also be indicated using a length of the data-excluded information query response frame.

As an optional implementation manner, the data-excluded information query request frame further includes the address of the first device. The verification code of the data-excluded information query response frame is verification code obtained by computing the address of the first device and source verification code by the second device, where the source verification code is verification code of the second device. The sending, by the first device, a data-contained information query request frame to the second device when the first device determines that a third hash value is consistent with the second hash value, where the data-contained information query request frame includes the address of the second device and an address of the first device, so that the second device responds to the data-contained information query request frame when receiving the data-contained information query request frame may include when determining that the third hash value is consistent with the second hash value, performing inverse computation on the second computation information and the address of the first device, and when determining that verification code obtained after the inverse computation is correct, sending, by the first device, the data-contained information query request frame to the second device, where the data-contained information query request frame includes the address of the second device and the address of the first device, so that the second device responds to the data-contained information query request frame when receiving the data-contained information query request frame. That is, the first device sends the data-contained information query request frame to the second device only when determining that the verification code obtained after the inverse computation is correct. The data-contained information query request frame includes the address of the second device and the address of the first device, so that the second device responds to the data-contained information query request frame when receiving the data-contained information query request frame.

The foregoing "being correct" refers to that the verification code obtained after the inverse computation is verified, and the verification succeeds.

As an optional implementation manner, the data-excluded information query request frame may further include the address of the first device, and the data-excluded information query response frame may further include the address of the first device. However, in this implementation manner, because the data-excluded information query request frame includes only the first control information, the first hash value, the address of the first device. The verification code, and the data-excluded information query response frame includes only the second control information, the first hash value, the address of the first device, the address of the second device, and the verification code, compared with an implementation manner in the prior art, utilization of network resources can also be improved. A location, in the data-excluded information query request frame, of the content included in the data-excluded information query request frame may not be limited, and a location, in the data-excluded information query response frame, of the content included in the data-excluded information query response frame may not be limited.

It should be noted that, the foregoing multiple optional implementation manners may be combined together for implementation.

In the foregoing technical solution, a data-excluded information query request frame includes only first control information and a first hash value, and the data-excluded information query response frame includes only second control information, a second hash value, and an address of a second device. When a first device acquires the data-excluded information query response frame, the first device sends a data-contained information query request frame to the second device when the first device determines that a third hash value is consistent with the second hash value. The data-contained information query request frame includes the address of the second device and an address of the first device, so that the second device responds to the data-contained information query request frame when receiving the data-contained information query request frame. In this embodiment of the present disclosure, the data-excluded information query request frame and the data-excluded information query response frame are shorter than a frame in the prior art, so that few network resources are occupied for query, and utilization of the network resources is high.

Figure 8:
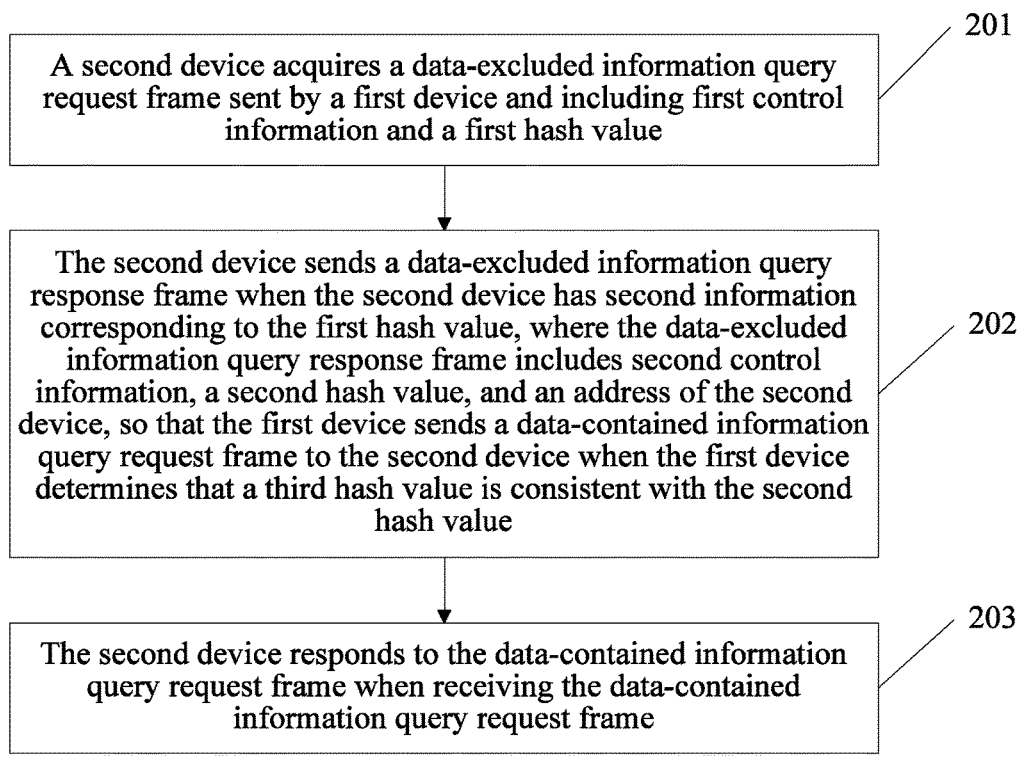
FIG. 8 is a schematic flowchart of another information query method according to an embodiment of the present disclosure.

FIG. 8 is a schematic flowchart of another information query method according to an embodiment of the present disclosure. As shown in FIG. 8, the method includes:

201: A second device acquires a data-excluded information query request frame sent by a first device and including first control information and a first hash value, where the first hash value is a hash value generated after first information is computed using a first hash function. The data-excluded information query request frame does not include a target address, and the first control information includes at least first indication information used for indicating a type of the data-excluded information query request frame.

The data-excluded information query request frame includes only the first control information and the first hash value, and does not include a target address. In this way, the data-excluded query request frame may have more bytes for carrying content information. For example, more bytes are used for carrying a hash value and may carry multiple first hash values.

That the data-excluded information query request frame does not include a target address may refer to that the data-excluded information query request frame does not include an address of a device acquiring the data-excluded information query request frame. The device acquiring the data-excluded information query request frame may include the foregoing second device, and the device acquiring the data-excluded information query request frame may further include another device in a network except the foregoing second device. In this way, when the first device sends the data-excluded information query request frame, there is no specific receiving device. That is, the first device only needs to be responsible for sending the data-excluded information query request frame, and the first device does not need to consider which device acquires the data-excluded information query request frame.

202: The second device sends a data-excluded information query response frame when the second device has second information corresponding to the first hash value. The data-excluded information query response frame includes second control information, a second hash value, and an address of the second device, so that the first device sends a data-contained information query request frame to the second device when the first device determines that a third hash value is consistent with the second hash value. The third hash value is a hash value generated after the first device computes the first information using the second hash function, and the data-contained information query request frame includes the address of the second device and an address of the first device. The second hash value is a hash value generated after the second device computes the second information using the second hash function, the data-excluded information query response frame does not include a target address, and the second control information includes at least second indication information used for indicating the type of the data-excluded information query request frame.

203: The second device responds to the data-contained information query request frame when receiving the data-contained information query request frame.

For that the second device responds to the data-contained information query request frame, refer to that a device responds to a MAC frame in the prior art.

When the first device determines that the third hash value is consistent with the second hash value, it indicates that the second device is a device that the first device needs to query. For example, the second device provides a service needed by the first device, such as, printing. For example, the second device is a device for which the first device needs to search. For example, the second device and the first device conduct a service at the same time, and for example, the second device and the first device run a game at the same time. For example, the second device and the first device log in using a same user identifier at the same time. The first device may send the data-contained information query request frame to the second device, and the second device responds to the data-contained information query request frame when receiving the data-contained information query request frame.

The second device may listen to in real time whether a data-excluded information query request frame is transmitted in the network, or periodically listen to whether a data-excluded information query request frame is transmitted in the network. When it is detected that a data-excluded information query request frame is transmitted in the network, the data-excluded information query request frame is acquired, and the acquired data-excluded information query response frame is parsed, to acquire a first hash value included in the data-excluded information query request frame. When the second device determines, according to the first hash value. That the second device has second information corresponding to the first hash value, the second device sends the data-excluded information query response frame. That the data-excluded information query response frame does not include a target address may refer to that the data-excluded information query response frame does not include an address of a device acquiring the data-excluded information query response frame. The device acquiring the data-excluded information query response frame may include the foregoing first device, and the device acquiring the data-excluded information query response frame may further include another device in the network except the foregoing first device.

The second hash value may be a hash value generated in advance, or may be a hash value generated after the second device computes the second information using the second hash function when the second device determines, according to the first hash value. That the second device has the second information corresponding to the first hash value.

As an optional implementation manner, the first hash function may include performing hash computation on the first information, and using N bits of a hash result of the computation as a hash value, where N is a natural number, and locations of the N bits in the result of the hash computation are not limited. That is, the first device performs hash computation on the first information, and uses N bits of the hash result of the hash computation as the first hash value. For example, the hash result is of 128 bits, and the first hash value is the last bit to the $32^{nd}$ bit from the bottom of the 128-bit hash value, or is the $33^{rd}$ bit from the bottom to the $64^{th}$ bit from the bottom of the 128-bit hash value.

The second hash computation function may include performing hash computation on the second information, and using W bits of a hash result of the computation as a hash value, where W is a natural number, and locations of the W bits in the result of the hash computation are not limited. That is, the second device performs hash computation on the second information, and uses W bits of the hash result of the hash computation as the first hash value. For example, the hash result is of 128 bits, and the second hash value is the last bit to the $32^{nd}$ bit from the bottom of the 128-bit hash value, or is the $33^{rd}$ bit from the bottom to the $64^{th}$ bit from the bottom of the 128-bit hash value.

When the second device has multiple pieces of second information, the data-excluded information query response frame may include multiple second hash values, and a quantity of bits of the second hash value may be in direct proportion to a quantity of the second information that the second device has. For example, when the second device has two pieces of second information, each of the two second hash values may be of 48 bits, when the second device has three pieces of second information, each of the three second hash values may be of 64 bits, and the like. A quantity of the bits of the second hash value increases. Therefore, the first device can be prevented from selecting wrong second information. For example, the second device has two pieces of second information, and values of hash results of the two pieces of information are stored in different places. For example, when first hash values both are the last bits to the $32^{nd}$ bits from the bottom of the two hash results, the $33^{rd}$ bits from the bottom to the $18^{th}$ bits from the bottom of the two hash results are different. In this way, two second hash values generated by the second device are different, so that the first device selects second information consistent with the first information from the two pieces of second information when acquiring the two second hash values.

As an optional implementation manner, the second hash value may further include the first hash value. That is, the first hash value is a part or all of the second hash value. For example, if a hash result obtained by performing hash computation on the first information is of 128 bits, the first hash value is the last bit to the $32^{nd}$ bit from the bottom of the hash value of 128 bits. The second information is consistent with the first information. That is, the hash result obtained by performing hash computation on the first information is the same as a hash result obtained by performing hash computation on the second information. The second hash value is the last bit to the $48^{th}$ bit from the bottom of the hash result obtained by performing hash computation on the second information.

As an optional implementation manner, the first hash function is the same as the second hash function. In this way, when the third hash value is consistent with the second hash value. That is, the hash result obtained by performing hash computation on the first information is the same as the hash result obtained by performing hash computation on the second information, and the first hash value is the same as the second hash value.

As an optional implementation manner, the second information refers to information whose hash value generated after the information is computed using the first hash function is consistent with the first hash value. The second device may compute, using the second hash function, information that the second device has, and when a computation result is consistent with the first hash value, it indicates that the information is the second information. Certainly, the information that the second device has may be computed using the second hash function in advance, or may be computed using the second hash function when the second device receives the first hash value. The second information may also refer to information of which the hash result includes the first hash value. That is, after hash computation is performed on the information, the hash result of the computation includes the first hash value.

As an optional implementation manner, the first control information may include at least the first indication information used for indicating the type of the data-excluded information query request frame. The second device acquires the first indication information when acquiring the data-excluded information query request frame. In this way, when responding to the data-excluded information query request frame, the second device may also respond to the data-excluded information query request frame using the data-excluded information query response frame. That is, the second device sends the data-excluded information query response frame. That is, the second control information includes at least the second indication information used for indicating the type of the data-excluded information query response frame.

The type of the data-excluded information query request frame may include a request type and a neutral type, and the type of the data-excluded information query response frame may include a publication type and a neutral type. When the type of the data-excluded information query request frame is a request type, the first hash value may indicate searching for the first information. For example, if the first information is information about a target, the first hash value is used for indicating searching for the target. That is, when the second device acquires that the type of the data-excluded information query request frame is a request type, the second device understands the first hash value as that the first device searches for the first information. For example, when the first information is information about a service, the first hash value indicates searching for the service, or when the first information is information about a user identifier, the first hash value indicates searching for the user identifier, or when the first information is information about a service, the first hash value indicates searching for the service. When the type of the data-excluded information query request frame is a request type, the type of the data-excluded information query response frame is a publication type, and the second hash value may indicate publishing the second information. For example, the second information may also be information about a target, so that the second hash value is used for indicating publishing the target. That is, when the first device acquires that the type of the data-excluded information query response frame is a request type, the first device understands the second hash value as that the second device publishes the second information. For example, when the second information is information about a service, the second hash value indicates publishing the service, or when the second information is information about a user identifier, the second hash value indicates publishing the user identifier, or when the second information is information about a service, the second hash value indicates publishing the service.

When the type of the data-excluded information query request frame is a neutral type, the first hash value may indicate that the first hash value matches the first information. For example, when the first information is information about a target, the first hash value may indicate that the first hash value matches the target. For example, when the first information is information about a game, the first hash value indicates that the first hash value matches the game, and for example, when the first information is information about a service, the first hash value indicates that the first hash value is used for matching the service. When the type of the data-excluded information query request frame is a neutral type, the type of the data-excluded information query response frame is a neutral type. That is, the second hash value may indicate that the second hash value matches the second information. For example, when the second information is information about a target, the second hash value may indicate that the second hash value matches the target. For example, when the second information is information about a game, the second hash value indicates that the second hash value matches the game, or when the second information is information about a service, the second hash value indicates that the second hash value matches the service. That is, a meaning indicated by the first hash value varies with a different type of the data-excluded information query request frame, and a meaning indicated by the second hash value varies with a different type of the data-excluded information query response frame.

As an optional implementation manner, the data-excluded information query request frame may further carry third indication information used for indicating a property of the first hash value, where the third indication information may be placed before the first hash value. When there are multiple first hash values, there are multiple pieces of third indication information, each piece of third indication information is used for indicating a property of one first hash value, and each piece of third indication information is placed before a corresponding first hash value. The data-excluded information query response frame may also carry fourth indication information used for indicating a property of the second hash value, where the fourth indication information may be placed before the second hash value. When there are multiple second hash values, there are multiple pieces of fourth indication information, each piece of fourth indication information is used for indicating a property of one third hash value, and each piece of fourth indication information is placed before a corresponding second hash value. The property of the first hash value may include a request property and a neutral property, and the property of the second hash value may include a publication property or a neutral property. For example, when the property of the first hash value is a request property, the first hash value may indicate searching for the first information. For example, the first information may be information about a target, so that the first hash value is used for indicating searching for the target. That is, when the second device acquires that the property of the first hash value is a request property, the second device understands the first hash value as that the first device searches for the first information. When the property of the first hash value is a request property, the property of the second hash value is a publication property, and the second hash value may indicate publishing the second information. When the property of the first hash value is a neutral property, the first hash value may indicate that the first hash value matches the first information. When the property of the first hash value is a neutral property, the property of the second hash value is a neutral property. That is, the second hash value may indicate that the second hash value matches the second information. That is, a meaning indicated by the first hash value varies with a different property of the first hash value, and a meaning indicated by the second hash value varies with a different property of the second hash value.

Optionally, the first indication information may include first type information and second type information, where the first type information is used for indicating that the data-excluded information query request frame is a data-excluded frame, a type of the data-excluded frame may include a request type, a publication type, and a neutral type. A property of a hash value of the data-excluded frame may include a request property, a publication property, and a neutral property. The second type information is used for indicating that the type of the data-excluded information query request frame is a request type or a neutral type. For example, a subtype field (a byte used for indicating a Subtype of a frame) in the first control information is the first type information. For example, the Subtype field in the first control information is 0001, and a type field (a byte used for indicating a Type of the frame) in the first control information is 00, and the other two bytes in the first control information are used for the second type information. For example, when the second type information is 00, it indicates that the type of the data-excluded information query request frame is a request type, and for example, when the second type information is 10, it indicates that the type of the data-excluded information query request frame is a neutral type.

Optionally, the second indication information may include third type information and fourth type information, where the third type information is used for indicating that the data-excluded information query response frame is a data-excluded frame. The fourth type information is used for indicating that the type of the data-excluded information query response frame is a publication type or a neutral type. For example, a Subtype field in the second control information is the third type information. For example, the Subtype field in the second control information is 0001, a Type field in the second control information is 00, and the other two bytes in the second control information are used for the fourth type information. For example, when the fourth type information is 01, it indicates that the type of the data-excluded information query response frame is a response type, and for example, when the fourth type information is 10, it indicates that the type of the data-excluded information query response frame is a neutral type.

Optionally, the first indication information may include fifth type information, where the fifth type information is used for indicating that the type of the data-excluded information query request frame is a request type or a neutral type. For example, a Subtype field in the first control information is the fifth type information. For example, when the Subtype field in the first control information is 0001, it indicates that the type of the data-excluded information query request frame is a request type, and when the Subtype field in the first control information is 0011, it indicates that the type of the data-excluded information query request frame is a neutral type.

Optionally, the second indication information may include sixth type information, where the sixth type information is used for indicating that the type of the data-excluded information query response frame is a publication type or a neutral type. For example, a Subtype field in the first control information is the fifth type information. For example, when the Subtype field in the second control information is 0010, it indicates that the type of the data-excluded information query response frame is a publication type, and when the Subtype field in the second control information is 0011, it indicates that the type of the data-excluded information query response frame is a neutral type.

As an optional implementation manner, the type of the data-excluded information query request frame or the property of the first hash value may be indicated using a length of the data-excluded information query request frame. Similarly, the type of the data-excluded information query response frame or the property of the second hash value may also be indicated using a length of the data-excluded information query response frame.

As an optional implementation manner, the data-excluded information query request frame further includes the address of the first device. The verification code of the data-excluded information query response frame is verification code obtained by computing the address of the first device and source verification code by the second device, where the source verification code is verification code of the second device. The sending, by the first device, a data-contained information query request frame to the second device when the first device determines that a third hash value is consistent with the second hash value, where the data-contained information query request frame includes the address of the second device and an address of the first device, so that the second device responds to the data-contained information query request frame when receiving the data-contained information query request frame may include when determining that the third hash value is consistent with the second hash value, performing inverse computation on the second computation information and the address of the first device, and when determining that verification code obtained after the inverse computation is correct, sending, by the first device, the data-contained information query request frame to the second device, where the data-contained information query request frame includes the address of the second device and the address of the first device, so that the second device responds to the data-contained information query request frame when receiving the data-contained information query request frame. That is, the first device sends the data-contained information query request frame to the second device only when determining that the verification code obtained after the inverse computation is correct, where the data-contained information query request frame includes the address of the second device and the address of the first device, so that the second device responds to the data-contained information query request frame when receiving the data-contained information query request frame.

The foregoing "being correct" refers to that the verification code obtained after the inverse computation is verified, and the verification succeeds.

As an optional implementation manner, the data-excluded information query request frame may further include the address of the first device, and the data-excluded information query response frame may further include the address of the first device. However, in this implementation manner, because the data-excluded information query request frame includes only the first control information, the first hash value, the address of the first device, and the verification code, and the data-excluded information query response frame includes only the second control information, the first hash value, the address of the first device, the address of the second device, and the verification code, compared with an implementation manner in the prior art, utilization of network resources can also be improved. A location, in the data-excluded information query request frame, of the content included in the data-excluded information query request frame may not be limited, and a location, in the data-excluded information query response frame, of the content included in the data-excluded information query response frame may not be limited.

It should be noted that, the foregoing multiple optional implementation manners may be combined together for implementation.

In the foregoing technical solution, a data-excluded information query request frame includes only first control information and a first hash value, and the data-excluded information query response frame includes only second control information, a second hash value, and an address of a second device. When a first device acquires the data-excluded information query response frame, the first device sends a data-contained information query request frame to the second device when the first device determines that a third hash value is consistent with the second hash value. The data-contained information query request frame includes the address of the second device and an address of the first device, so that the second device responds to the data-contained information query request frame when receiving the data-contained information query request frame. In this embodiment of the present disclosure, the data-excluded information query request frame and the data-excluded information query response frame are shorter than a frame in the prior art, so that few network resources are occupied for a query, and utilization of the network resources is high.

Figure 9:
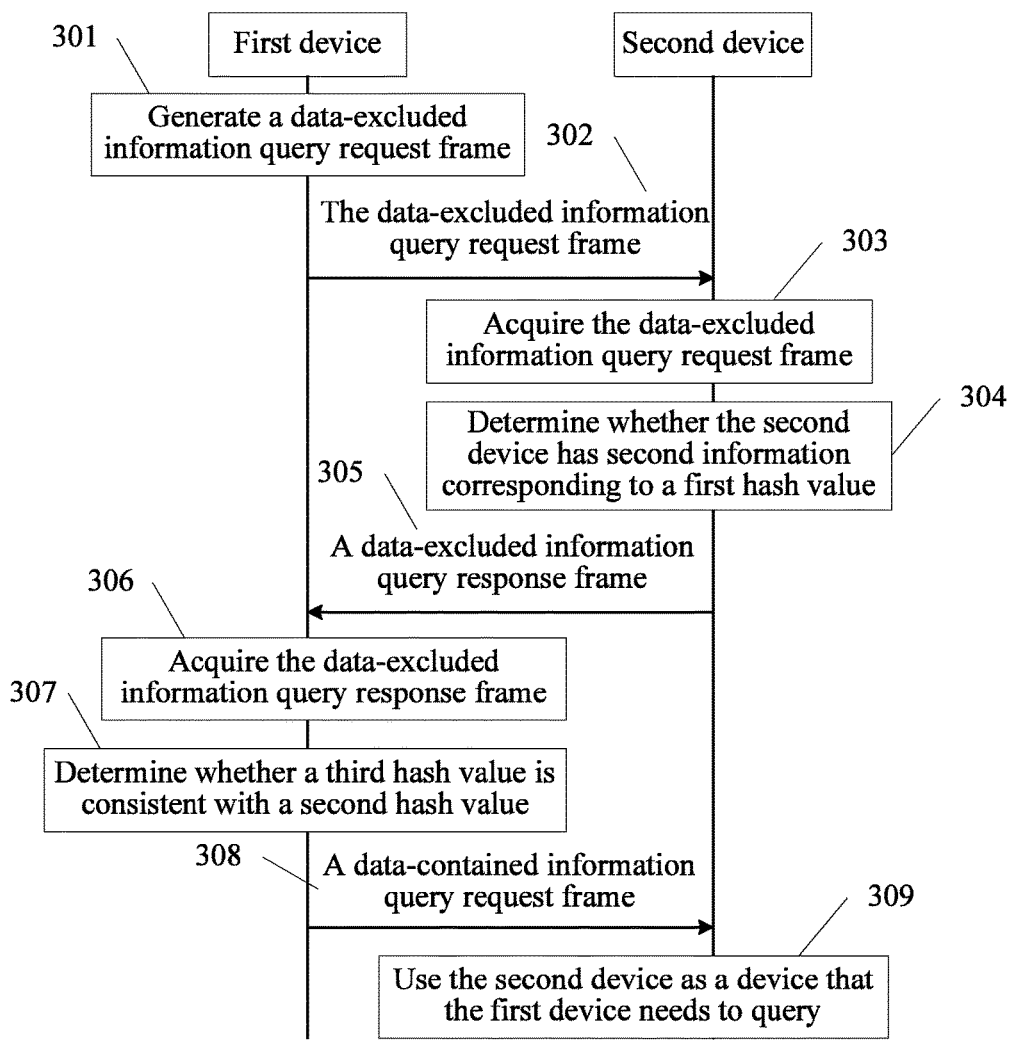
FIG. 9 is a schematic flowchart of another information query method according to an embodiment of the present disclosure.

FIG. 9 is a schematic diagram of another information query method according to an embodiment of the present disclosure. As shown in FIG. 9, the method includes:

301: A first device generates a data-excluded information query request frame. The data-excluded information query request frame includes first control information and a first hash value, the first hash value is a hash value generated after first information is computed using a first hash function. The data-excluded information query request frame does not include a target address, and the first control information includes at least first indication information used for indicating a type of the data-excluded information query request frame.

302: The first device sends the data-excluded information query request frame.

303: A second device acquires the data-excluded information query request frame.

304: The second device determines whether the second device has second information corresponding to the first hash value, and if yes, perform step 304; otherwise, end the procedure.

305: Send the data-excluded information query response frame including second control information, a second hash value, and an address of the second device, where the second hash value is a hash value generated after the second device computes the second information using a second hash function. The data-excluded information query response frame does not include a target address, and the second control information includes at least second indication information used for indicating the type of the data-excluded information query request frame.

306: The first device acquires the data-excluded information query response frame.

307: The first device determines whether a third hash value is consistent with the second hash value, and if yes, perform step 308; otherwise, end the procedure, where the third hash value is a hash value generated after the first device computes the first information using the second hash function.

308: The first device sends a data-contained information query request frame to the second device, where the data-contained information query request frame includes the address of the second device and an address of the first device.

309: The second device responds to the data-contained information query request frame when receiving the data-contained information query request frame.

In the foregoing technical solution, a data-excluded information query request frame includes only first control information and a first hash value, and the data-excluded information query response frame includes only second control information, a second hash value, and an address of a second device. When a first device acquires the data-excluded information query response frame, the first device sends a data-contained information query request frame to the second device when the first device determines that a third hash value is consistent with the second hash value. The data-contained information query request frame includes the address of the second device and an address of the first device, so that the second device responds to the data-contained information query request frame when receiving the data-contained information query request frame. In this embodiment of the present disclosure, the data-excluded information query request frame and the data-excluded information query response frame are shorter than a frame in the prior art, so that few network resources are occupied for a query, and utilization of the network resources is high.

The following are apparatus embodiments of the present disclosure, the apparatus embodiments of the present disclosure are used to perform the methods implemented in method embodiments 1 to 3 of the present disclosure. For the convenience of description, only parts related to the embodiments of the present disclosure are shown, and for specific technical details that are not disclosed, refer to Embodiment 1, Embodiment 2, and Embodiment 3 of the present disclosure.

Figure 10:
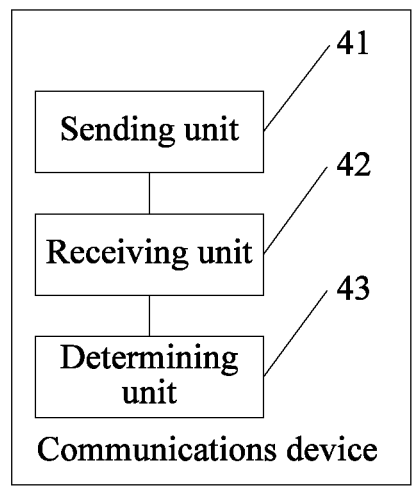
FIG. 10 is a schematic structural diagram of a communications device according to an embodiment of the present disclosure.

FIG. 10 is a schematic structural diagram of a communications device according to an embodiment of the present disclosure. As shown in FIG. 10, the communications device includes: a sending unit 41, a receiving unit 42, and a determining unit 43.

The sending unit 41 is configured to send a data-excluded information query request frame, where the data-excluded information query request frame includes first control information and a first hash value. The first hash value is a hash value generated after first information is computed using a first hash function, the data-excluded information query request frame does not include a target address, and the first control information includes at least first indication information used for indicating a type of the data-excluded information query request frame.

The receiving unit 42 receives a data-excluded information query response frame sent by a second device, where the data-excluded information query response frame includes second control information, a second hash value, and an address of the second device. The second hash value is a hash value generated after the second device computes second information using a second hash function, the data-excluded information query response frame does not include a target address, and the second control information includes at least second indication information used for indicating the type of the data-excluded information query request frame.

The receiving unit 42 may listen to in real time whether a data-excluded information query request frame is transmitted in the network, or periodically listen to whether a data-excluded information query request frame is transmitted in the network. When it is detected that a data-excluded information query request frame is transmitted in the network, the data-excluded information query request frame is acquired, and the acquired data-excluded information query response frame is parsed, to acquire a first hash value included in the data-excluded information query request frame. When the second device determines, according to the first hash value. That the second device has second information corresponding to the first hash value, the second device sends the data-excluded information query response frame. That the data-excluded information query response frame does not include a target address may refer to that the data-excluded information query response frame does not include an address of a device acquiring the data-excluded information query response frame. The device acquiring the data-excluded information query response frame may include the foregoing communications device, and the device acquiring the data-excluded information query response frame may further include another device in the network except the foregoing communications device.

The second hash value may be a hash value generated by the second device in advance, or may be a hash value generated after the second device computes the second information using the second hash function when the second device determines, according to the first hash value. That the second device has the second information corresponding to the first hash value.

The determining unit 43 is configured to send a data-contained information query request frame to the second device when determining that a third hash value is consistent with the second hash value. The third hash value is a hash value generated after the first information is computed using the second hash function. The data-contained information query request frame includes the address of the second device and an address of the communications device, so that the second device responds to the data-contained information query request frame when receiving the data-contained information query request frame.

When the communications device determines that the third hash value is consistent with the second hash value, it indicates that the second device is a device that the communications device needs to query. For example, the second device provides a service needed by the communications device, such as, printing. For example, the second device is a device for which the communications device needs to search. For example, the second device and the communications device conduct a service at the same time, and for example, the second device and the communications device run a game at the same time. For example, the second device and the communications device log in using a same user identifier at the same time. The communications device may send the data-contained information query request frame to the second device, and the second device responds to the data-contained information query request frame when receiving the data-contained information query request frame.

As an optional implementation manner, the first hash function may include performing hash computation on the first information, and using N bits of a hash result of the computation as a hash value, where N is a natural number, and locations of the N bits in the result of the hash computation are not limited. That is, the generating unit 41 performs hash computation on the first information, and uses N bits of the hash result of the hash computation as the first hash value. For example, the hash result is of 128 bits, and the first hash value is the last bit to the $32^{nd}$ bit from the bottom of the 128-bit hash value, or is the $33^{rd}$ bit from the bottom to the $64^{th}$ bit from the bottom of the 128-bit hash value.

The second hash function may include performing hash computation on the second information, and using W bits of a hash result of the computation as a hash value, where W is a natural number, and locations of the W bits in the result of the hash computation are not limited. That is, the second device performs hash computation on the second information, and uses W bits of the hash result of the hash computation as the first hash value. For example, the hash result is of 128 bits, and the second hash value is the last bit to the $32^{nd}$ bit from the bottom of the 128-bit hash value, or is the $33^{rd}$ bit from the bottom to the $64^{th}$ bit from the bottom of the 128-bit hash value.

As an optional implementation manner, the data-excluded information query response frame includes multiple second hash values. That is, the second device has multiple pieces of second information, and the determining unit 44 may be further configured to send the data-contained information query request frame to the second device when determining that the third hash value is consistent with at least one second hash value in the multiple second hash values. The data-contained information query request frame includes the address of the second device and an address of the communications device, so that the second device responds to the data-contained information query request frame when receiving the data-contained information query request frame.

When the second device has multiple pieces of second information, the data-excluded information query response frame may include multiple second hash values, and a quantity of bits of the second hash value may be in direct proportion to a quantity of the second information that the second device has. For example, when the second device has two pieces of second information, each of the two second hash values may be of 48 bits, when the second device has three pieces of second information, each of the three second hash values may be of 64 bits, and the like. A quantity of the bits of the second hash value increases; therefore, the communications device can be prevented from selecting wrong second information. For example, the second device has two pieces of second information, and values of hash results of the two pieces of information are stored in different places. For example, when first hash values both are the last bits to the $32^{nd}$ bits from the bottom of the two hash results, the $33^{rd}$ bits from the bottom to the $18^{th}$ bits from the bottom of the two hash results are different. In this way, two second hash values generated by the second device are different, so that the communications device selects second information consistent with the first information from the two pieces of second information when acquiring the two second hash values.

As an optional implementation manner, the second hash value may further include the first hash value. That is, the first hash value is a part or all of the second hash value. For example, if a hash result obtained by performing hash computation on the first information is of 128 bits, the first hash value is the last bit to the $32^{nd}$ bit from the bottom of the hash value of 128 bits. The second information is consistent with the first information. That is, the hash result obtained by performing hash computation on the first information is the same as a hash result obtained by performing hash computation on the second information, and the second hash value is the last bit to the $48^{th}$ bit from the bottom of the hash result obtained by performing hash computation on the second information.

As an optional implementation manner, the first hash function is the same as the second hash function. In this way, when the third hash value is consistent with the second hash value. That is, the hash result obtained by performing hash computation on the first information is the same as the hash result obtained by performing hash computation on the second information, and the first hash value is the same as the second hash value.

As an optional implementation manner, the second information refers to information whose hash value generated after the information is computed using the first hash function is consistent with the first hash value. The second device may compute, using the second hash function, information that the second device has, and when a computation result is consistent with the first hash value, it indicates that the information is the second information. Certainly, the information that the second device has may be computed using the second hash function in advance, or may be computed using the second hash function when the second device receives the first hash value. The second information may also refer to information of which the hash result includes the first hash value. That is, after hash computation is performed on the information, the hash result of the computation includes the first hash value.

As an optional implementation manner, the data-excluded information query request frame may not include a transmit address. That is, not include an address of the communications device. In this way, when the second device acquires the data-excluded information query request frame, the second device does not know which device sends the data-excluded information query request frame, and then, the second device sends the data-excluded information query response frame in a manner in which the communications device sends the data-excluded information query request frame. In addition, the data-excluded information query request frame and the data-excluded information query response frame may not include a duration/identifier field or a sequence control field in a frame in the prior art. That is, in this embodiment, the data-excluded information query request frame may include only control information, a hash value, and verification code, and the data-excluded information query response frame includes only the first control information, the second hash value, the address of the second device, and verification code. In this way, in the data-excluded information query request frame, besides the first hash value, other information accounts for a small proportion, so that the utilization of wireless resources and query efficiency are improved. In addition, to further improve the query efficiency, in this embodiment, one data-excluded frame is not limited to carrying only one hash value and may carry multiple different hash values. For example, the data-excluded information query request frame may carry multiple first hash values, and in the data-excluded information query response frame, there may also be more bytes used for carrying second hash values. For example, the data-excluded information query response frame may carry multiple second hash values. Certainly, a quantity of second hash values carried in the data-excluded information query response frame is not necessarily the same as a quantity of data-excluded information query request frames. The data-excluded information query response frame may carry only a second hash value corresponding to one or more first hash values in the multiple first hash values carried in the data-excluded information query request frame. For one data-excluded information query request frame, the second device may reply with one or more data-excluded information query response frames, or multiple different second devices may reply with one or more data-excluded information query response frames corresponding to the second devices.

As an optional implementation manner, the first control information may include at least the first indication information used for indicating the type of the data-excluded information query request frame. The second device acquires the first indication information when acquiring the data-excluded information query request frame. In this way, when responding to the data-excluded information query request frame, the second device may also respond to the data-excluded information query request frame using the data-excluded information query response frame. That is, the second device sends the data-excluded information query response frame. That is, the second control information includes at least the second indication information used for indicating the type of the data-excluded information query response frame.

The type of the data-excluded information query request frame may include a request type and a neutral type, and the type of the data-excluded information query response frame may include a publication type and a neutral type. When the type of the data-excluded information query request frame is a request type, the first hash value may indicate searching for the first information. For example, if the first information is information about a target, the first hash value is used for indicating searching for the target. That is, when the type of the data-excluded information query request frame acquired by the second device is a request type, the second device understands the first hash value as that the communications device searches for the first information. For example, when the first information is information about a service, the first hash value indicates searching for the service, or when the first information is information about a user identifier, the first hash value indicates searching for the user identifier, or when the first information is information about a service, the first hash value indicates searching for the service. When the type of the data-excluded information query request frame is a request type, the type of the data-excluded information query response frame is a publication type, and the second hash value may indicate publishing the second information. For example, the second information may also be information about a target, so that the second hash value is used for indicating publishing the target. That is, when the communications device acquires that the type of the data-excluded information query response frame is a request type, the communications device understands the second hash value as that the second device publishes the second information. For example, when the second information is information about a service, the second hash value indicates publishing the service, or when the second information is information about a user identifier, the second hash value indicates publishing the user identifier, or when the second information is information about a service, the second hash value indicates publishing the service.

When the type of the data-excluded information query request frame is a neutral type, the first hash value may indicate that the first hash value matches the first information. For example, when the first information is information about a target, the first hash value may indicate that the first hash value matches the target. For example, when the first information is information about a game, the first hash value indicates that the first hash value matches the game, and for example, when the first information is information about a service, the first hash value indicates that the first hash value is used for matching the service. When the type of the data-excluded information query request frame is a neutral type, the type of the data-excluded information query response frame is a neutral type. That is, the second hash value may indicate that the second hash value matches the second information. For example, when the second information is information about a target, the second hash value may indicate that the second hash value matches the target. For example, when the second information is information about a game, the second hash value indicates that the second hash value matches the game, or when the second information is information about a service, the second hash value indicates that the second hash value matches the service. That is, a meaning indicated by the first hash value varies with a different type of the data-excluded information query request frame, and a meaning indicated by the second hash value varies with a different type of the data-excluded information query response frame.

As an optional implementation manner, the data-excluded information query request frame may further carry third indication information used for indicating a property of the first hash value, where the third indication information may be placed before the first hash value. When there are multiple first hash values, there are multiple pieces of third indication information, each piece of third indication information is used for indicating a property of one first hash value, and each piece of third indication information is placed before a corresponding first hash value. The data-excluded information query response frame may also carry fourth indication information used for indicating a property of the second hash value, where the fourth indication information may be placed before the second hash value. When there are multiple second hash values, there are multiple pieces of fourth indication information, each piece of fourth indication information is used for indicating a property of one third hash value, and each piece of fourth indication information is placed before a corresponding second hash value. The property of the first hash value may include a request property and a neutral property, and the property of the second hash value may include a publication property or a neutral property. For example, when the property of the first hash value is a request property, the first hash value may indicate searching for the first information. For example, the first information may be information about a target, so that the first hash value is used for indicating searching for the target. That is, when the second device acquires that the property of the first hash value is a request property, the second device understands the first hash value as that the communications device searches for the first information. When the property of the first hash value is a request property, the property of the second hash value is a publication property, and the second hash value may indicate publishing the second information. When the property of the first hash value is a neutral property, the first hash value may indicate that the first hash value matches the first information. When the property of the first hash value is a neutral property, the property of the second hash value is a neutral property. That is, the second hash value may indicate that the second hash value matches the second information. That is, a meaning indicated by the first hash value varies with a different property of the first hash value, and a meaning indicated by the second hash value varies with a different property of the second hash value.

Optionally, the first indication information may include first type information and second type information. The first type information is used for indicating that the data-excluded information query request frame is a data-excluded frame, a type of the data-excluded frame may include a request type, a publication type, and a neutral type, and a property of a hash value of the data-excluded frame may include a request property, a publication property, and a neutral property. The second type information is used for indicating that the type of the data-excluded information query request frame is a request type or a neutral type. For example, a subtype field (a byte used for indicating a Subtype of a frame) in the first control information is the first type information. For example, the Subtype field in the first control information is 0001, and a type field (a byte used for indicating a Type of the frame) in the first control information is 00, and the other two bytes in the first control information are used for the second type information. For example, when the second type information is 00, it indicates that the type of the data-excluded information query request frame is a request type, and for example, when the second type information is 10, it indicates that the type of the data-excluded information query request frame is a neutral type.

Optionally, the second indication information may include third type information and fourth type information, where the third type information is used for indicating that the data-excluded information query response frame is a data-excluded frame. The fourth type information is used for indicating that the type of the data-excluded information query response frame is a publication type or a neutral type. For example, a Subtype field in the second control information is the third type information. For example, the Subtype field in the second control information is 0001, a Type field in the second control information is 00, and the other two bytes in the second control information are used for the fourth type information. For example, when the fourth type information is 01, it indicates that the type of the data-excluded information query response frame is a response type, and for example, when the fourth type information is 10, it indicates that the type of the data-excluded information query response frame is a neutral type.

Optionally, the first indication information may include fifth type information, where the fifth type information is used for indicating that the type of the data-excluded information query request frame is a request type or a neutral type. For example, a Subtype field in the first control information is the fifth type information. For example, when the Subtype field in the first control information is 0001, it indicates that the type of the data-excluded information query request frame is a request type, and when the Subtype field in the first control information is 0011, it indicates that the type of the data-excluded information query request frame is a neutral type.

Optionally, the second indication information may include sixth type information, where the sixth type information is used for indicating that the type of the data-excluded information query response frame is a publication type or a neutral type. For example, a Subtype field in the first control information is the fifth type information. For example, when the Subtype field in the second control information is 0010, it indicates that the type of the data-excluded information query response frame is a publication type, and when the Subtype field in the second control information is 0011, it indicates that the type of the data-excluded information query response frame is a neutral type.

As an optional implementation manner, the type of the data-excluded information query request frame or the property of the first hash value may be indicated using a length of the data-excluded information query request frame. Similarly, the type of the data-excluded information query response frame or the property of the second hash value may also be indicated using a length of the data-excluded information query response frame.

As an optional implementation manner, the data-excluded information query request frame further includes the address of the communications device. The verification code of the data-excluded information query response frame is verification code obtained by computing the address of the communications device and source verification code by the second device, where the source verification code is verification code of the second device. The determining unit 43 may be further configured to: when determining that the third hash value is consistent with the second hash value, perform inverse computation on the second computation information and the address of the communications device. The determining unit 43 may be further configured to: when determining that verification code obtained after the inverse computation is correct, send the data-contained information query request frame to the second device. The data-contained information query request frame includes the address of the second device and the address of the communications device, so that the second device responds to the data-contained information query request frame when receiving the data-contained information query request frame. That is, the communications device sends the data-contained information query request frame to the second device only when determining that the verification code obtained after the inverse computation is correct. Where the data-contained information query request frame includes the address of the second device and the address of the communications device, so that the second device responds to the data-contained information query request frame when receiving the data-contained information query request frame.

The foregoing "being correct" refers to that the verification code obtained after the inverse computation is verified, and the verification succeeds.

As an optional implementation manner, the data-excluded information query request frame may further include the address of the communications device, and the data-excluded information query response frame may further include the address of the communications device. However, in this implementation manner, because the data-excluded information query request frame includes only the first control information, the first hash value, the address of the communications device, and the verification code, and the data-excluded information query response frame includes only the second control information, the first hash value, the address of the communications device, the address of the second device, and the verification code, compared with an implementation manner in the prior art, utilization of network resources can also be improved. A location, in the data-excluded information query request frame, of the content included in the data-excluded information query request frame may not be limited, and a location, in the data-excluded information query response frame, of the content included in the data-excluded information query response frame may not be limited.

It should be noted that, the foregoing multiple optional implementation manners may be combined together for implementation. The communications device may be the first device described in the foregoing method embodiments, and the second device may be the second device described in the foregoing method embodiments.

In the foregoing technical solution, a data-excluded information query request frame includes only first control information and a first hash value, and the data-excluded information query response frame includes only second control information, a second hash value, and an address of a second device. When a communications device acquires the data-excluded information query response frame, the communications device sends a data-contained information query request frame to the second device when the communications device determines that a third hash value is consistent with the second hash value. The data-contained information query request frame includes the address of the second device and an address of the communications device, so that the second device responds to the data-contained information query request frame when receiving the data-contained information query request frame. In this embodiment of the present disclosure, the data-excluded information query request frame and the data-excluded information query response frame are shorter than a frame in the prior art, so that few network resources are occupied for a query, and utilization of the network resources is high.

Figure 11:
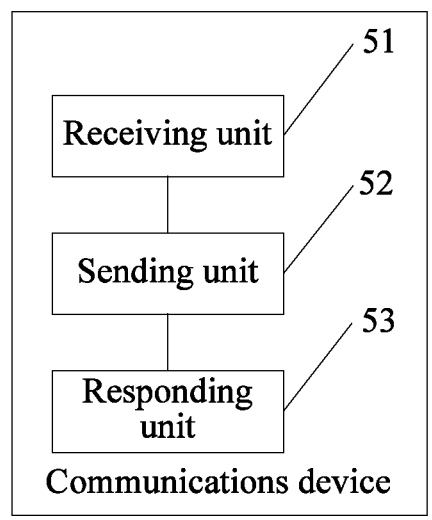
FIG. 11 is a schematic structural diagram of another communications device according to an embodiment of the present disclosure.

FIG. 11 is a schematic structural diagram of a communications device according to an embodiment of the present disclosure. As shown in FIG. 11, the communications device includes: a receiving unit 51, a sending unit 52, and a responding unit 53.

The receiving unit 51 is configured to acquire a data-excluded information query request frame sent by a first device and including first control information and a first hash value, where the first hash value is a hash value generated after first information is computed using a first hash function. The data-excluded information query request frame does not include a target address, and the first control information includes at least first indication information used for indicating a type of the data-excluded information query request frame.

The sending unit 52 is configured to send a data-excluded information query response frame when the communications device has second information corresponding to the first hash value. The data-excluded information query response frame includes second control information, a second hash value, and an address of the second device, so that the first device sends a data-contained information query request frame to the communications device when the first device determines that a third hash value is consistent with the second hash value. The third hash value is a hash value generated after the first device computes the first information using the second hash function. The data-contained information query request frame includes an address of the communications device and an address of the first device, the second hash value is a hash value generated after the communications device computes the second information using the second hash function. The data-excluded information query response frame does not include a target address, and the second control information includes at least second indication information used for indicating the type of the data-excluded information query request frame.

The responding unit 53 is configured to respond to the data-contained information query request frame when the data-contained information query request frame is received.

When the first device determines that the third hash value is consistent with the second hash value, it indicates that the communications device is a device that the first device needs to query. For example, the communications device provides a service needed by the first device, such as, printing. For example, the communications device is a device for which the first device needs to search. For example, the communications device and the first device conduct a service at the same time, and for example, the communications device and the first device run a game at the same time. For example, the communications device and the first device log in using a same user identifier at the same time. The first device may send the data-contained information query request frame to the communications device, and the communications device responds to the data-contained information query request frame when receiving the data-contained information query request frame.

The acquiring unit 51 may listen to in real time whether a data-excluded information query request frame is transmitted in the network, or periodically listen to whether a data-excluded information query request frame is transmitted in the network. When it is detected that a data-excluded information query request frame is transmitted in the network, the data-excluded information query request frame is acquired, and the acquired data-excluded information query response frame is parsed, to acquire a first hash value included in the data-excluded information query request frame. When the communications device determines, according to the first hash value. That the communications device has second information corresponding to the first hash value, the communications device sends the data-excluded information query response frame. That the data-excluded information query response frame does not include a target address may refer to that the data-excluded information query response frame does not include an address of a device acquiring the data-excluded information query response frame. The device acquiring the data-excluded information query response frame may include the foregoing first device, and the device acquiring the data-excluded information query response frame may further include another device in the network except the foregoing first device.

The second hash value may be a hash value generated in advance, or may be a hash value generated after the communications device computes the second information using the second hash function when the communications device determines, according to the first hash value. That the communications device has the second information corresponding to the first hash value.

As an optional implementation manner, the first hash function may include performing hash computation on the first information, and using N bits of a hash result of the computation as a hash value, where N is a natural number, and locations of the N bits in the result of the hash computation are not limited. That is, the first device performs hash computation on the first information, and uses N bits of the hash result of the hash computation as the first hash value. For example, the hash result is of 128 bits, and the first hash value is the last bit to the $32^{nd}$ bit from the bottom of the 128-bit hash value, or is the $33^{rd}$ bit from the bottom to the 64th bit from the bottom of the 128-bit hash value.

The second hash function may include performing, by the communications device, hash computation on the second information, and using W bits of a hash result of the computation as a hash value, where W is a natural number, and locations of the W bits in the result of the hash computation are not limited. That is, the communications device performs hash computation on the second information, and uses W bits of the hash result of the hash computation as the first hash value. For example, the hash result is of 128 bits, and the second hash value is the last bit to the $32^{nd}$ bit from the bottom of the 128-bit hash value, or is the $33^{rd}$ bit from the bottom to the $64^{th}$ bit from the bottom of the 128-bit hash value.

When the communications device has multiple pieces of second information, the data-excluded information query response frame may include multiple second hash values, and a quantity of bits of the second hash value may be in direct proportion to a quantity of the second information that the communications device has. For example, when the communications device has two pieces of second information, each of the two second hash values may be of 48 bits, when the communications device has three pieces of second information, each of the three second hash values may be of 64 bits, and the like. A quantity of the bits of the second hash value increases; therefore, the first device can be prevented from selecting wrong second information. For example, the communications device has two pieces of second information, and values of hash results of the two pieces of information are stored in different places. For example, when first hash values both are the last bits to the $32^{nd}$ bits from the bottom of the two hash results, the $33^{rd}$ bits from the bottom to the $18^{th}$ bits from the bottom of the two hash results are different. In this way, two second hash values generated by the communications device are different, so that the first device selects second information consistent with the first information from the two pieces of second information when acquiring the two second hash values.

As an optional implementation manner, the second hash value may further include the first hash value. That is, the first hash value is a part or all of the second hash value. For example, if a hash result obtained by performing hash computation on the first information is of 128 bits, the first hash value is the last bit to the $32^{nd}$ bit from the bottom of the hash value of 128 bits. The second information is consistent with the first information. That is, the hash result obtained by performing hash computation on the first information is the same as a hash result obtained by performing hash computation on the second information, and the second hash value is the last bit to the $48^{th}$ bit from the bottom of the hash result obtained by performing hash computation on the second information.

As an optional implementation manner, the first hash function is the same as the second hash function. In this way, when the third hash value is consistent with the second hash value. That is, the hash result obtained by performing hash computation on the first information is the same as the hash result obtained by performing hash computation on the second information, the first hash value is the same as the second hash value.

As an optional implementation manner, the second information refers to information whose hash value generated after the information is computed using the first hash function is consistent with the first hash value. The communications device may compute, using the second hash function, information that the communications device has, and when a computation result is consistent with the first hash value, it indicates that the information is the second information. Certainly, the information that the communications device has may be computed using the second hash function in advance, or may be computed using the second hash function when the communications device receives the first hash value. The second information may also refer to information of which the hash result includes the first hash value. That is, after hash computation is performed on the information, the hash result of the computation includes the first hash value.

As an optional implementation manner, the first control information may include at least the first indication information used for indicating the type of the data-excluded information query request frame. The communications device acquires the first indication information when acquiring the data-excluded information query request frame. In this way, when responding to the data-excluded information query request frame, the communications device may also respond to the data-excluded information query request frame using the data-excluded information query response frame. That is, the communications device sends the data-excluded information query response frame. That is, the second control information includes at least the second indication information used for indicating the type of the data-excluded information query response frame.

The type of the data-excluded information query request frame may include a request type and a neutral type, and the type of the data-excluded information query response frame may include a publication type and a neutral type. When the type of the data-excluded information query request frame is a request type, the first hash value may indicate searching for the first information. For example, if the first information is information about a target, the first hash value is used for indicating searching for the target. That is, when the communications device acquires that the type of the data-excluded information query request frame is a request type, the communications device understands the first hash value as that the first device searches for the first information. For example, when the first information is information about a service, the first hash value indicates searching for the service, or when the first information is information about a user identifier, the first hash value indicates searching for the user identifier, or when the first information is information about a service, the first hash value indicates searching for the service. When the type of the data-excluded information query request frame is a request type, the type of the data-excluded information query response frame is a publication type, and the second hash value may indicate publishing the second information. For example, the second information may also be information about a target, so that the second hash value is used for indicating publishing the target. That is, when the first device acquires that the type of the data-excluded information query response frame is a request type, the first device understands the second hash value as that the communications device publishes the second information. For example, when the second information is information about a service, the second hash value indicates publishing the service, or when the second information is information about a user identifier, the second hash value indicates publishing the user identifier, or when the second information is information about a service, the second hash value indicates publishing the service.

When the type of the data-excluded information query request frame is a neutral type, the first hash value may indicate that the first hash value matches the first information. For example, when the first information is information about a target, the first hash value may indicate that the first hash value matches the target. For example, when the first information is information about a game, the first hash value indicates that the first hash value matches the game, and for example, when the first information is information about a service, the first hash value indicates that the first hash value is used for matching the service. When the type of the data-excluded information query request frame is a neutral type, the type of the data-excluded information query response frame is a neutral type. That is, the second hash value may indicate that the second hash value matches the second information. For example, when the second information is information about a target, the second hash value may indicate that the second hash value matches the target. For example, when the second information is information about a game, the second hash value indicates that the second hash value matches the game, or when the second information is information about a service, the second hash value indicates that the second hash value matches the service. That is, a meaning indicated by the first hash value varies with a different type of the data-excluded information query request frame, and a meaning indicated by the second hash value varies with a different type of the data-excluded information query response frame.

As an optional implementation manner, the data-excluded information query request frame may further carry third indication information used for indicating a property of the first hash value, where the third indication information may be placed before the first hash value. When there are multiple first hash values, there are multiple pieces of third indication information, each piece of third indication information is used for indicating a property of one first hash value, and each piece of third indication information is placed before a corresponding first hash value. The data-excluded information query response frame may also carry fourth indication information used for indicating a property of the second hash value, where the fourth indication information may be placed before the second hash value. When there are multiple second hash values, there are multiple pieces of fourth indication information, each piece of fourth indication information is used for indicating a property of one third hash value, and each piece of fourth indication information is placed before a corresponding second hash value. The property of the first hash value may include a request property and a neutral property, and the property of the second hash value may include a publication property or a neutral property. For example, when the property of the first hash value is a request property, the first hash value may indicate searching for the first information. For example, the first information may be information about a target, so that the first hash value is used for indicating searching for the target. That is, when the communications device acquires that the property of the first hash value is a request property, the communications device understands the first hash value as that the first device searches for the first information. When the property of the first hash value is a request property, the property of the second hash value is a publication property, and the second hash value may indicate publishing the second information. When the property of the first hash value is a neutral property, the first hash value may indicate that the first hash value matches the first information. When the property of the first hash value is a neutral property, the property of the second hash value is a neutral property. That is, the second hash value may indicate that the second hash value matches the second information. That is, a meaning indicated by the first hash value varies with a different property of the first hash value, and a meaning indicated by the second hash value varies with a different property of the second hash value.

Optionally, the first indication information may include first type information and second type information. The first type information is used for indicating that the data-excluded information query request frame is a data-excluded frame, a type of the data-excluded frame may include a request type, a publication type, and a neutral type, and a property of a hash value of the data-excluded frame may include a request property, a publication property, and a neutral property. The second type information is used for indicating that the type of the data-excluded information query request frame is a request type or a neutral type. For example, a subtype field (a byte used for indicating a Subtype of a frame) in the first control information is the first type information. For example, the Subtype field in the first control information is 0001, and a type field (a byte used for indicating a Type of the frame) in the first control information is 00, and the other two bytes in the first control information are used for the second type information. For example, when the second type information is 00, it indicates that the type of the data-excluded information query request frame is a request type, and for example, when the second type information is 10, it indicates that the type of the data-excluded information query request frame is a neutral type.

Optionally, the second indication information may include third type information and fourth type information. The third type information is used for indicating that the data-excluded information query response frame is a data-excluded frame, and the fourth type information is used for indicating that the type of the data-excluded information query response frame is a publication type or a neutral type. For example, a Subtype field in the second control information is the third type information. For example, the Subtype field in the second control information is 0001, a Type field in the second control information is 00, and the other two bytes in the second control information are used for the fourth type information. For example, when the fourth type information is 01, it indicates that the type of the data-excluded information query response frame is a response type, and for example, when the fourth type information is 10, it indicates that the type of the data-excluded information query response frame is a neutral type.

Optionally, the first indication information may include fifth type information, where the fifth type information is used for indicating that the type of the data-excluded information query request frame is a request type or a neutral type. For example, a Subtype field in the first control information is the fifth type information. For example, when the Subtype field in the first control information is 0001, it indicates that the type of the data-excluded information query request frame is a request type, and when the Subtype field in the first control information is 0011, it indicates that the type of the data-excluded information query request frame is a neutral type.

Optionally, the second indication information may include sixth type information, where the sixth type information is used for indicating that the type of the data-excluded information query response frame is a publication type or a neutral type. For example, a Subtype field in the first control information is the fifth type information. For example, when the Subtype field in the second control information is 0010, it indicates that the type of the data-excluded information query response frame is a publication type, and when the Subtype field in the second control information is 0011, it indicates that the type of the data-excluded information query response frame is a neutral type.

As an optional implementation manner, the type of the data-excluded information query request frame or the property of the first hash value may be indicated using a length of the data-excluded information query request frame. Similarly, the type of the data-excluded information query response frame or the property of the second hash value may also be indicated using a length of the data-excluded information query response frame.

As an optional implementation manner, the data-excluded information query request frame further includes the address of the first device. The verification code of the data-excluded information query response frame is verification code obtained by computing the address of the first device and source verification code by the communications device, where the source verification code is verification code of the communications device. The sending, by the first device, a data-contained information query request frame to the communications device when the first device determines that a third hash value is consistent with the second hash value, where the data-contained information query request frame includes the address of the communications device and an address of the first device, so that the communications device responds to the data-contained information query request frame when receiving the data-contained information query request frame may include when determining that the third hash value is consistent with the second hash value, performing inverse computation on the second computation information and the address of the first device, and when determining that verification code obtained after the inverse computation is correct, sending, by the first device, the data-contained information query request frame to the communications device, where the data-contained information query request frame includes the address of the communications device and the address of the first device, so that the communications device responds to the data-contained information query request frame when receiving the data-contained information query request frame. That is, the first device sends the data-contained information query request frame to the communications device only when determining that the verification code obtained after the inverse computation is correct. The data-contained information query request frame includes the address of the communications device and the address of the first device, so that the communications device responds to the data-contained information query request frame when receiving the data-contained information query request frame.

The foregoing "being correct" refers to that the verification code obtained after the inverse computation is verified, and the verification succeeds.

As an optional implementation manner, the data-excluded information query request frame may further include the address of the first device, and the data-excluded information query response frame may further include the address of the first device. However, in this implementation manner, because the data-excluded information query request frame includes only the first control information, the first hash value, the address of the first device. The verification code, and the data-excluded information query response frame includes only the second control information, the first hash value, the address of the first device, the address of the communications device, and the verification code, compared with an implementation manner in the prior art, utilization of network resources can also be improved. A location, in the data-excluded information query request frame, of the content included in the data-excluded information query request frame may not be limited, and a location, in the data-excluded information query response frame, of the content included in the data-excluded information query response frame may not be limited.

It should be noted that, the foregoing multiple optional implementation manners may be combined together for implementation. The first device may be the first device described in the foregoing method embodiments, and the communications device may be the communications device described in the foregoing method embodiments.

In the foregoing technical solution, a data-excluded information query request frame includes only first control information and a first hash value, and the data-excluded information query response frame includes only second control information, a second hash value, and an address of a communications device. When a first device acquires the data-excluded information query response frame, the first device sends a data-contained information query request frame to the communications device when the first device determines that a third hash value is consistent with the second hash value. The data-contained information query request frame includes the address of the communications device and an address of the first device, so that the communications device responds to the data-contained information query request frame when receiving the data-contained information query request frame. In this embodiment of the present disclosure, the data-excluded information query request frame and the data-excluded information query response frame are shorter than a frame in the prior art, so that few network resources are occupied for a query, and utilization of the network resources is high.

Figure 12:
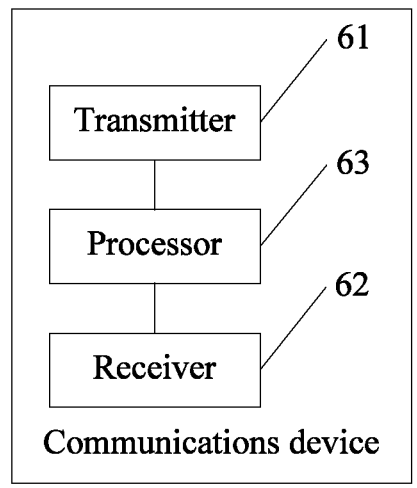
FIG. 12 is a schematic structural diagram of another communications device according to an embodiment of the present disclosure.

FIG. 12 is a schematic structural diagram of another communications device according to an embodiment of the present disclosure. As shown in FIG. 12, the communications device includes: a transmitter 61, a receiver 62, and a processor 63 separately coupled with the transmitter 61 and the receiver 62.

The transmitter 61 is configured to send a data-excluded information query request frame, where the data-excluded information query request frame includes first control information and a first hash value, the first hash value is a hash value generated after first information is computed using a first hash function. The data-excluded information query request frame does not include a target address, and the first control information includes at least first indication information used for indicating a type of the data-excluded information query request frame. The transmitter 61 is also configured to send the data-excluded information query request frame.

The receiver 62 is configured to receive a data-excluded information query response frame sent by a second device, where the data-excluded information query response frame includes second control information, a second hash value, and an address of the second device. The second hash value is a hash value generated after the second device computes second information using a second hash function, the data-excluded information query response frame does not include a target address, and the second control information includes at least second indication information used for indicating the type of the data-excluded information query request frame.

The processor 63 is configured to parse the data-excluded information query response frame received by the receiver 62, to obtain the second hash value, and determine whether a third hash value is consistent with the second hash value, where the third hash value is a hash value generated after the first information is computed using the second hash function.

The transmitter 61 is further configured to send a data-contained information query request frame to the second device when the processor 63 determines that the third hash value is consistent with the second hash value. The data-contained information query request frame includes the address of the second device and an address of the communications device, so that the second device responds to the data-contained information query request frame when receiving the data-contained information query request frame.

When the communications device determines that the third hash value is consistent with the second hash value, it indicates that the second device is a device that the communications device needs to query. For example, the second device provides a service needed by the communications device, such as, printing. For example, the second device is a device for which the communications device needs to search. For example, the second device and the communications device conduct a service at the same time, and for example, the second device and the communications device run a game at the same time. For example, the second device and the communications device log in using a same user identifier at the same time. The communications device may send the data-contained information query request frame to the second device, and the second device responds to the data-contained information query request frame when receiving the data-contained information query request frame.

As an optional implementation manner, the first hash function may include performing, by the processor 63, hash computation on the first information, and using N bits of a hash result of the computation as a hash value, where N is a natural number, and locations of the N bits in the result of the hash computation are not limited. That is, the communications device performs hash computation on the first information, and uses N bits of the hash result of the hash computation as the first hash value. For example, the hash result is of 128 bits, and the first hash value is the last bit to the $32^{nd}$ bit from the bottom of the 128-bit hash value, or is the $33^{rd}$ bit from the bottom to the 64th bit from the bottom of the 128-bit hash value.

The second hash function may include performing hash computation on the second information, and using W bits of a hash result of the computation as a hash value, where W is a natural number, and locations of the W bits in the result of the hash computation are not limited. That is, the second device performs hash computation on the second information, and uses W bits of the hash result of the hash computation as the first hash value. For example, the hash result is of 128 bits, and the second hash value is the last bit to the $32^{nd}$ bit from the bottom of the 128-bit hash value, or is the $33^{rd}$ bit from the bottom to the $64^{th}$ bit from the bottom of the 128-bit hash value.

As an optional implementation manner, the data-excluded information query response frame includes multiple second hash values. That is, the second device has multiple pieces of second information, and the processor 63 is further configured to determine whether the third hash value is consistent with at least one second hash value in the multiple second hash values. The transmitter 61 may be further configured to send the data-contained information query request frame to the second device when the processor 63 determines that the third hash value is consistent with at least one second hash value in the multiple second hash values.

When the second device has multiple pieces of second information, the data-excluded information query response frame may include multiple second hash values, and a quantity of bits of the second hash value may be in direct proportion to a quantity of the second information that the second device has. For example, when the second device has two pieces of second information, each of the two second hash values may be of 48 bits, when the second device has three pieces of second information, each of the three second hash values may be of 64 bits, and the like. A quantity of the bits of the second hash value increases; therefore, the communications device can be prevented from selecting wrong second information. For example, the second device has two pieces of second information, and values of hash results of the two pieces of information are stored in different places. For example, when first hash values both are the last bits to the $32^{nd}$ bits from the bottom of the two hash results, the $33^{rd}$ bits from the bottom to the $18^{th}$ bits from the bottom of the two hash results are different. In this way, two second hash values generated by the second device are different, so that the communications device selects second information consistent with the first information from the two pieces of second information when acquiring the two second hash values.

As an optional implementation manner, the second hash value may further include the first hash value. That is, the first hash value is a part or all of the second hash value. For example, if a hash result obtained by performing hash computation on the first information is of 128 bits, the first hash value is the last bit to the $32^{nd}$ bit from the bottom of the hash value of 128 bits. The second information is consistent with the first information. That is, the hash result obtained by performing hash computation on the first information is the same as a hash result obtained by performing hash computation on the second information, and the second hash value is the last bit to the $48^{th}$ bit from the bottom of the hash result obtained by performing hash computation on the second information.

As an optional implementation manner, the first hash function is the same as the second hash function. In this way, when the third hash value is consistent with the second hash value. That is, the hash result obtained by performing hash computation on the first information is the same as the hash result obtained by performing hash computation on the second information, and the first hash value is the same as the second hash value.

As an optional implementation manner, the second information refers to information whose hash value generated after the information is computed using the first hash function is consistent with the first hash value. The second device may compute, using the second hash function, information that the second device has, and when a computation result is consistent with the first hash value, it indicates that the information is the second information. Certainly, the information that the second device has may be computed using the second hash function in advance, or may be computed using the second hash function when the second device receives the first hash value. The second information may also refer to information of which the hash result includes the first hash value. That is, after hash computation is performed on the information, the hash result of the computation includes the first hash value.

As an optional implementation manner, the data-excluded information query request frame may not include a transmit address. That is, not include an address of the communications device. In this way, when the second device acquires the data-excluded information query request frame, the second device does not know which device sends the data-excluded information query request frame, and then, the second device sends the data-excluded information query response frame in a manner in which the communications device sends the data-excluded information query request frame. In addition, the data-excluded information query request frame and the data-excluded information query response frame may not include a duration/identifier field or a sequence control field in a frame in the prior art. That is, in this embodiment, the data-excluded information query request frame may include only control information, a hash value, and verification code, and the data-excluded information query response frame includes only the first control information, the second hash value, the address of the second device, and verification code. In this way, in the data-excluded information query request frame, besides the first hash value, other information accounts for a small proportion, so that the utilization of wireless resources and query efficiency are improved. In addition, to further improve the query efficiency, in this embodiment, one data-excluded frame is not limited to carrying only one hash value and may carry multiple different hash values. For example, the data-excluded information query request frame may carry multiple first hash values, and in the data-excluded information query response frame, there may also be more bytes used for carrying second hash values. For example, the data-excluded information query response frame may carry multiple second hash values. Certainly, a quantity of second hash values carried in the data-excluded information query response frame is not necessarily the same as a quantity of data-excluded information query request frames. The data-excluded information query response frame may carry only a second hash value corresponding to one or more first hash values in the multiple first hash values carried in the data-excluded information query request frame. For one data-excluded information query request frame, the second device may reply with one or more data-excluded information query response frames, or multiple different second devices may reply with one or more data-excluded information query response frames corresponding to the second devices.

As an optional implementation manner, the first control information may include at least the first indication information used for indicating the type of the data-excluded information query request frame. The second device acquires the first indication information when acquiring the data-excluded information query request frame. In this way, when responding to the data-excluded information query request frame, the second device may also respond to the data-excluded information query request frame using the data-excluded information query response frame. That is, the second device sends the data-excluded information query response frame. That is, the second control information includes at least the second indication information used for indicating the type of the data-excluded information query response frame.

The type of the data-excluded information query request frame may include a request type and a neutral type, and the type of the data-excluded information query response frame may include a publication type and a neutral type. When the type of the data-excluded information query request frame is a request type, the first hash value may indicate searching for the first information. For example, if the first information is information about a target, the first hash value is used for indicating searching for the target. That is, when the type of the data-excluded information query request frame acquired by the second device is a request type, the second device understands the first hash value as that the communications device searches for the first information. For example, when the first information is information about a service, the first hash value indicates searching for the service, or when the first information is information about a user identifier, the first hash value indicates searching for the user identifier, or when the first information is information about a service, the first hash value indicates searching for the service. When the type of the data-excluded information query request frame is a request type, the type of the data-excluded information query response frame is a publication type, and the second hash value may indicate publishing the second information. For example, the second information may also be information about a target, so that the second hash value is used for indicating publishing the target. That is, when the communications device acquires that the type of the data-excluded information query response frame is a request type, the communications device understands the second hash value as that the second device publishes the second information. For example, when the second information is information about a service, the second hash value indicates publishing the service, or when the second information is information about a user identifier, the second hash value indicates publishing the user identifier, or when the second information is information about a service, the second hash value indicates publishing the service.

When the type of the data-excluded information query request frame is a neutral type, the first hash value may indicate that the first hash value matches the first information. For example, when the first information is information about a target, the first hash value may indicate that the first hash value matches the target. For example, when the first information is information about a game, the first hash value indicates that the first hash value matches the game, and for example, when the first information is information about a service, the first hash value indicates that the first hash value is used for matching the service. When the type of the data-excluded information query request frame is a neutral type, the type of the data-excluded information query response frame is a neutral type. That is, the second hash value may indicate that the second hash value matches the second information. For example, when the second information is information about a target, the second hash value may indicate that the second hash value matches the target. For example, when the second information is information about a game, the second hash value indicates that the second hash value matches the game, or when the second information is information about a service, the second hash value indicates that the second hash value matches the service. That is, a meaning indicated by the first hash value varies with a different type of the data-excluded information query request frame, and a meaning indicated by the second hash value varies with a different type of the data-excluded information query response frame.

As an optional implementation manner, the data-excluded information query request frame may further carry third indication information used for indicating a property of the first hash value, where the third indication information may be placed before the first hash value. When there are multiple first hash values, there are multiple pieces of third indication information, each piece of third indication information is used for indicating a property of one first hash value, and each piece of third indication information is placed before a corresponding first hash value. The data-excluded information query response frame may also carry fourth indication information used for indicating a property of the second hash value, where the fourth indication information may be placed before the second hash value. When there are multiple second hash values, there are multiple pieces of fourth indication information, each piece of fourth indication information is used for indicating a property of one third hash value, and each piece of fourth indication information is placed before a corresponding second hash value. The property of the first hash value may include a request property and a neutral property, and the property of the second hash value may include a publication property or a neutral property. For example, when the property of the first hash value is a request property, the first hash value may indicate searching for the first information. For example, the first information may be information about a target, so that the first hash value is used for indicating searching for the target. That is, when the second device acquires that the property of the first hash value is a request property, the second device understands the first hash value as that the communications device searches for the first information. When the property of the first hash value is a request property, the property of the second hash value is a publication property, and the second hash value may indicate publishing the second information. When the property of the first hash value is a neutral property, the first hash value may indicate that the first hash value matches the first information. When the property of the first hash value is a neutral property, the property of the second hash value is a neutral property. That is, the second hash value may indicate that the second hash value matches the second information. That is, a meaning indicated by the first hash value varies with a different property of the first hash value, and a meaning indicated by the second hash value varies with a different property of the second hash value.

Optionally, the first indication information may include first type information and second type information, where the first type information is used for indicating that the data-excluded information query request frame is a data-excluded frame. A type of the data-excluded frame may include a request type, a publication type, and a neutral type, and a property of a hash value of the data-excluded frame may include a request property, a publication property, and a neutral property. The second type information is used for indicating that the type of the data-excluded information query request frame is a request type or a neutral type. For example, a subtype field (a byte used for indicating a Subtype of a frame) in the first control information is the first type information. For example, the Subtype field in the first control information is 0001, and a type field (a byte used for indicating a Type of the frame) in the first control information is 00, and the other two bytes in the first control information are used for the second type information. For example, when the second type information is 00, it indicates that the type of the data-excluded information query request frame is a request type, and for example, when the second type information is 10, it indicates that the type of the data-excluded information query request frame is a neutral type.

Optionally, the second indication information may include third type information and fourth type information, where the third type information is used for indicating that the data-excluded information query response frame is a data-excluded frame. The fourth type information is used for indicating that the type of the data-excluded information query response frame is a publication type or a neutral type. For example, a Subtype field in the second control information is the third type information. For example, the Subtype field in the second control information is 0001, a Type field in the second control information is 00, and the other two bytes in the second control information are used for the fourth type information. For example, when the fourth type information is 01, it indicates that the type of the data-excluded information query response frame is a response type, and for example, when the fourth type information is 10, it indicates that the type of the data-excluded information query response frame is a neutral type.

Optionally, the first indication information may include fifth type information, where the fifth type information is used for indicating that the type of the data-excluded information query request frame is a request type or a neutral type. For example, a Subtype field in the first control information is the fifth type information. For example, when the Subtype field in the first control information is 0001, it indicates that the type of the data-excluded information query request frame is a request type, and when the Subtype field in the first control information is 0011, it indicates that the type of the data-excluded information query request frame is a neutral type.

Optionally, the second indication information may include sixth type information, where the sixth type information is used for indicating that the type of the data-excluded information query response frame is a publication type or a neutral type. For example, a Subtype field in the first control information is the fifth type information. For example, when the Subtype field in the second control information is 0010, it indicates that the type of the data-excluded information query response frame is a publication type, and when the Subtype field in the second control information is 0011, it indicates that the type of the data-excluded information query response frame is a neutral type.

As an optional implementation manner, the type of the data-excluded information query request frame or the property of the first hash value may be indicated using a length of the data-excluded information query request frame. Similarly, the type of the data-excluded information query response frame or the property of the second hash value may also be indicated using a length of the data-excluded information query response frame.

As an optional implementation manner, the data-excluded information query request frame further includes the address of the communications device. The verification code of the data-excluded information query response frame is verification code obtained by computing the address of the communications device and source verification code by the second device, where the source verification code is verification code of the second device. The sending, by the communications device, a data-contained information query request frame to the second device when the communications device determines that the third hash value is consistent with the second hash value, where the data-contained information query request frame includes the address of the second device and an address of the communications device, so that the second device responds to the data-contained information query request frame when receiving the data-contained information query request frame may include when determining that the third hash value is consistent with the second hash value, performing inverse computation on the second computation information and the address of the communications device, and when determining that verification code obtained after the inverse computation is correct, sending, by the communications device, the data-contained information query request frame to the second device, where the data-contained information query request frame includes the address of the second device and the address of the communications device, so that the second device responds to the data-contained information query request frame when receiving the data-contained information query request frame. That is, the communications device sends the data-contained information query request frame to the second device only when determining that the verification code obtained after the inverse computation is correct. The data-contained information query request frame includes the address of the second device and the address of the communications device, so that the second device responds to the data-contained information query request frame when receiving the data-contained information query request frame.

The foregoing "being correct" refers to that the verification code obtained after the inverse computation is verified, and the verification succeeds.

As an optional implementation manner, the data-excluded information query request frame may further include the address of the communications device, and the data-excluded information query response frame may further include the address of the communications device. However, in this implementation manner, because the data-excluded information query request frame includes only the first control information, the first hash value, the address of the communications device, and the verification code. The data-excluded information query response frame includes only the second control information, the first hash value, the address of the communications device, the address of the second device, and the verification code, compared with an implementation manner in the prior art, utilization of network resources can also be improved. A location, in the data-excluded information query request frame, of the content included in the data-excluded information query request frame may not be limited, and a location, in the data-excluded information query response frame, of the content included in the data-excluded information query response frame may not be limited.

It should be noted that, the foregoing multiple optional implementation manners may be combined together for implementation. The communications device may be the first device described in the foregoing method embodiments, and the second device may be the second device described in the foregoing method embodiments.

In the foregoing technical solution, a data-excluded information query request frame includes only first control information and a first hash value, and the data-excluded information query response frame includes only second control information, a second hash value, and an address of a second device. When a communications device acquires the data-excluded information query response frame, the communications device sends a data-contained information query request frame to the second device when the communications device determines that a third hash value is consistent with the second hash value. The data-contained information query request frame includes the address of the second device and an address of the communications device, so that the second device responds to the data-contained information query request frame when receiving the data-contained information query request frame. In this embodiment of the present disclosure, the data-excluded information query request frame and the data-excluded information query response frame are shorter than a frame in the prior art, so that few network resources are occupied for a query, and utilization of the network resources is high.

Figure 13:
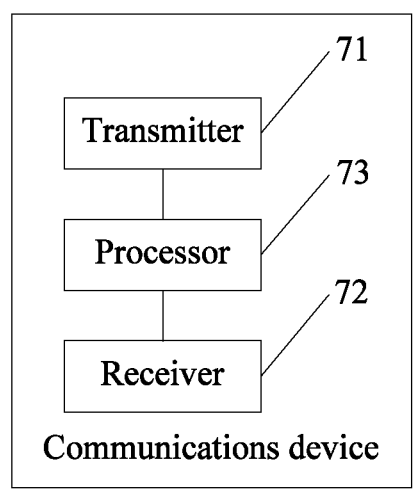
FIG. 13 is a schematic structural diagram of another communications device according to an embodiment of the present disclosure.

FIG. 13 is a schematic structural diagram of another communications device according to an embodiment of the present disclosure. As shown in FIG. 13, the communications device includes: a transmitter 71, a receiver 72, and a processor 73 separately coupled with the transmitter 71 and the receiver 72.

The receiver 71 is configured to acquire a data-excluded information query request frame sent by a first device and including first control information and a first hash value, where the first hash value is a hash value generated after first information is computed using a first hash function. The data-excluded information query request frame does not include a target address, and the first control information includes at least first indication information used for indicating a type of the data-excluded information query request frame.

The processor 73 is configured to parse the data-excluded information query request frame received by the receiver 71, to obtain the first hash value, and determine whether the communications device has second information corresponding to the first hash value.

The transmitter 72 is configured to send a data-excluded information query response frame when the processor 73 determines that the communications device has the second information corresponding to the first hash value. The data-excluded information query response frame includes second control information, a second hash value, and an address of the communications device, so that the first device sends a data-contained information query request frame to the communications device when the first device determines that a third hash value is consistent with the second hash value. The third hash value is a hash value generated after the first device computes the first information using the second hash function. The data-contained information query request frame includes the address of the communications device and an address of the first device, the second hash value is a hash value generated after the processor computes the second information using the second hash function. The data-excluded information query response frame does not include a target address, and the second control information includes at least second indication information used for indicating the type of the data-excluded information query request frame.

The processor 73 is further configured to respond to the data-contained information query request frame when the data-contained information query request frame is received.

The receiver 72 may listen to in real time whether a data-excluded information query request frame is transmitted in the network, or periodically listen to whether a data-excluded information query request frame is transmitted in the network. When it is detected that a data-excluded information query request frame is transmitted in the network, the data-excluded information query request frame is acquired, and the acquired data-excluded information query response frame is parsed, to acquire a first hash value included in the data-excluded information query request frame. When the communications device determines, according to the first hash value. That the communications device has second information corresponding to the first hash value, the communications device sends the data-excluded information query response frame. That the data-excluded information query response frame does not include a target address may refer to that the data-excluded information query response frame does not include an address of a device acquiring the data-excluded information query response frame. The device acquiring the data-excluded information query response frame may include the foregoing first device, and the device acquiring the data-excluded information query response frame may further include another device in the network except the foregoing first device.

The second hash value may be a hash value generated in advance, or may be a hash value generated after the communications device computes the second information using the second hash function when the communications device determines, according to the first hash value. That the communications device has the second information corresponding to the first hash value.

As an optional implementation manner, the first hash function may include performing hash computation on the first information, and using N bits of a hash result of the computation as a hash value, where N is a natural number, and locations of the N bits in the result of the hash computation are not limited. That is, the first device performs hash computation on the first information, and uses N bits of the hash result of the hash computation as the first hash value. For example, the hash result is of 128 bits, and the first hash value is the last bit to the $32^{nd}$ bit from the bottom of the 128-bit hash value, or is the $33^{rd}$ bit from the bottom to the 64th bit from the bottom of the 128-bit hash value.

The second hash function may include performing, by the processor 73, hash computation on the second information, and using W bits of a hash result of the computation as a hash value, where W is a natural number, and locations of the W bits in the result of the hash computation are not limited. That is, the communications device performs hash computation on the second information, and uses W bits of the hash result of the hash computation as the first hash value. For example, the hash result is of 128 bits, and the second hash value is the last bit to the $32^{nd}$ bit from the bottom of the 128-bit hash value, or is the $33^{rd}$ bit from the bottom to the $64^{th}$ bit from the bottom of the 128-bit hash value.

When the communications device has multiple pieces of second information, the data-excluded information query response frame may include multiple second hash values, and a quantity of bits of the second hash value may be in direct proportion to a quantity of the second information that the communications device has. For example, when the communications device has two pieces of second information, each of the two second hash values may be of 48 bits, when the communications device has three pieces of second information, each of the three second hash values may be of 64 bits, and the like. A quantity of the bits of the second hash value increases; therefore, the first device can be prevented from selecting wrong second information. For example, the communications device has two pieces of second information, and values of hash results of the two pieces of information are stored in different places. For example, when first hash values both are the last bits to the $32^{nd}$ bits from the bottom of the two hash results, the $33^{rd}$ bits from the bottom to the $18^{th}$ bits from the bottom of the two hash results are different. In this way, two second hash values generated by the communications device are different, so that the first device selects second information consistent with the first information from the two pieces of second information when acquiring the two second hash values.

As an optional implementation manner, the second hash value may further include the first hash value. That is, the first hash value is a part or all of the second hash value. For example, if a hash result obtained by performing hash computation on the first information is of 128 bits, the first hash value is the last bit to the $32^{nd}$ bit from the bottom of the hash value of 128 bits. The second information is consistent with the first information. That is, the hash result obtained by performing hash computation on the first information is the same as a hash result obtained by performing hash computation on the second information, and the second hash value is the last bit to the $48^{th}$ bit from the bottom of the hash result obtained by performing hash computation on the second information.

As an optional implementation manner, the first hash function is the same as the second hash function. In this way, when the third hash value is consistent with the second hash value. That is, the hash result obtained by performing hash computation on the first information is the same as the hash result obtained by performing hash computation on the second information, and the first hash value is the same as the second hash value.

As an optional implementation manner, the second information refers to information whose hash value generated after the information is computed using the first hash function is consistent with the first hash value. The communications device may compute, using the second hash function, information that the communications device has, and when a computation result is consistent with the first hash value, it indicates that the information is the second information. Certainly, the information that the communications device has may be computed using the second hash function in advance, or may be computed using the second hash function when the communications device receives the first hash value. The second information may also refer to information of which the hash result includes the first hash value. That is, after hash computation is performed on the information, the hash result of the computation includes the first hash value.

As an optional implementation manner, the first control information may include at least the first indication information used for indicating the type of the data-excluded information query request frame. The communications device acquires the first indication information when acquiring the data-excluded information query request frame. In this way, when responding to the data-excluded information query request frame, the communications device may also respond to the data-excluded information query request frame using the data-excluded information query response frame. That is, the communications device sends the data-excluded information query response frame. That is, the second control information includes at least the second indication information used for indicating the type of the data-excluded information query response frame.

The type of the data-excluded information query request frame may include a request type and a neutral type, and the type of the data-excluded information query response frame may include a publication type and a neutral type. When the type of the data-excluded information query request frame is a request type, the first hash value may indicate searching for the first information. For example, if the first information is information about a target, the first hash value is used for indicating searching for the target. That is, when the communications device acquires that the type of the data-excluded information query request frame is a request type, the communications device understands the first hash value as that the first device searches for the first information. For example, when the first information is information about a service, the first hash value indicates searching for the service, or when the first information is information about a user identifier, the first hash value indicates searching for the user identifier, or when the first information is information about a service, the first hash value indicates searching for the service. When the type of the data-excluded information query request frame is a request type, the type of the data-excluded information query response frame is a publication type, and the second hash value may indicate publishing the second information. For example, the second information may also be information about a target, so that the second hash value is used for indicating publishing the target. That is, when the first device acquires that the type of the data-excluded information query response frame is a request type, the first device understands the second hash value as that the communications device publishes the second information. For example, when the second information is information about a service, the second hash value indicates publishing the service, or when the second information is information about a user identifier, the second hash value indicates publishing the user identifier, or when the second information is information about a service, the second hash value indicates publishing the service.

When the type of the data-excluded information query request frame is a neutral type, the first hash value may indicate that the first hash value matches the first information. For example, when the first information is information about a target, the first hash value may indicate that the first hash value matches the target. For example, when the first information is information about a game, the first hash value indicates that the first hash value matches the game, and for example, when the first information is information about a service, the first hash value indicates that the first hash value is used for matching the service. When the type of the data-excluded information query request frame is a neutral type, the type of the data-excluded information query response frame is a neutral type. That is, the second hash value may indicate that the second hash value matches the second information. For example, when the second information is information about a target, the second hash value may indicate that the second hash value matches the target. For example, when the second information is information about a game, the second hash value indicates that the second hash value matches the game, or when the second information is information about a service, the second hash value indicates that the second hash value matches the service. That is, a meaning indicated by the first hash value varies with a different type of the data-excluded information query request frame, and a meaning indicated by the second hash value varies with a different type of the data-excluded information query response frame.

As an optional implementation manner, the data-excluded information query request frame may further carry third indication information used for indicating a property of the first hash value, where the third indication information may be placed before the first hash value. When there are multiple first hash values, there are multiple pieces of third indication information, each piece of third indication information is used for indicating a property of one first hash value, and each piece of third indication information is placed before a corresponding first hash value. The data-excluded information query response frame may also carry fourth indication information used for indicating a property of the second hash value, where the fourth indication information may be placed before the second hash value. When there are multiple second hash values, there are multiple pieces of fourth indication information, each piece of fourth indication information is used for indicating a property of one third hash value, and each piece of fourth indication information is placed before a corresponding second hash value. The property of the first hash value may include a request property and a neutral property, and the property of the second hash value may include a publication property or a neutral property. For example, when the property of the first hash value is a request property, the first hash value may indicate searching for the first information. For example, the first information may be information about a target, so that the first hash value is used for indicating searching for the target. That is, when the communications device acquires that the property of the first hash value is a request property, the communications device understands the first hash value as that the first device searches for the first information. When the property of the first hash value is a request property, the property of the second hash value is a publication property, and the second hash value may indicate publishing the second information. When the property of the first hash value is a neutral property, the first hash value may indicate that the first hash value matches the first information. When the property of the first hash value is a neutral property, the property of the second hash value is a neutral property. That is, the second hash value may indicate that the second hash value matches the second information. That is, a meaning indicated by the first hash value varies with a different property of the first hash value, and a meaning indicated by the second hash value varies with a different property of the second hash value.

Optionally, the first indication information may include first type information and second type information, where the first type information is used for indicating that the data-excluded information query request frame is a data-excluded frame. A type of the data-excluded frame may include a request type, a publication type, and a neutral type, and a property of a hash value of the data-excluded frame may include a request property, a publication property, and a neutral property. The second type information is used for indicating that the type of the data-excluded information query request frame is a request type or a neutral type. For example, a subtype field (a byte used for indicating a Subtype of a frame) in the first control information is the first type information. For example, the Subtype field in the first control information is 0001, and a type field (a byte used for indicating a Type of the frame) in the first control information is 00, and the other two bytes in the first control information are used for the second type information. For example, when the second type information is 00, it indicates that the type of the data-excluded information query request frame is a request type, and for example, when the second type information is 10, it indicates that the type of the data-excluded information query request frame is a neutral type.

Optionally, the second indication information may include third type information and fourth type information, where the third type information is used for indicating that the data-excluded information query response frame is a data-excluded frame. The fourth type information is used for indicating that the type of the data-excluded information query response frame is a publication type or a neutral type. For example, a Subtype field in the second control information is the third type information. For example, the Subtype field in the second control information is 0001, a Type field in the second control information is 00, and the other two bytes in the second control information are used for the fourth type information. For example, when the fourth type information is 01, it indicates that the type of the data-excluded information query response frame is a response type, and for example, when the fourth type information is 10, it indicates that the type of the data-excluded information query response frame is a neutral type.

Optionally, the first indication information may include fifth type information, where the fifth type information is used for indicating that the type of the data-excluded information query request frame is a request type or a neutral type. For example, a Subtype field in the first control information is the fifth type information. For example, when the Subtype field in the first control information is 0001, it indicates that the type of the data-excluded information query request frame is a request type, and when the Subtype field in the first control information is 0011, it indicates that the type of the data-excluded information query request frame is a neutral type.

Optionally, the second indication information may include sixth type information, where the sixth type information is used for indicating that the type of the data-excluded information query response frame is a publication type or a neutral type. For example, a Subtype field in the first control information is the fifth type information. For example, when the Subtype field in the second control information is 0010, it indicates that the type of the data-excluded information query response frame is a publication type, and when the Subtype field in the second control information is 0011, it indicates that the type of the data-excluded information query response frame is a neutral type.

As an optional implementation manner, the type of the data-excluded information query request frame or the property of the first hash value may be indicated using a length of the data-excluded information query request frame. Similarly, the type of the data-excluded information query response frame or the property of the second hash value may also be indicated using a length of the data-excluded information query response frame.

As an optional implementation manner, the data-excluded information query request frame further includes the address of the first device. The verification code of the data-excluded information query response frame is verification code obtained by computing the address of the first device and source verification code by the communications device, where the source verification code is verification code of the communications device. The sending, by the first device, a data-contained information query request frame to the communications device when the first device determines that a third hash value is consistent with the second hash value, where the data-contained information query request frame includes the address of the communications device and an address of the first device, so that the communications device responds to the data-contained information query request frame when receiving the data-contained information query request frame may include when determining that the third hash value is consistent with the second hash value, performing inverse computation on the second computation information and the address of the first device, and when determining that verification code obtained after the inverse computation is correct, sending, by the first device, the data-contained information query request frame to the communications device, where the data-contained information query request frame includes the address of the communications device and the address of the first device, so that the communications device responds to the data-contained information query request frame when receiving the data-contained information query request frame. That is, the first device sends the data-contained information query request frame to the communications device only when determining that the verification code obtained after the inverse computation is correct. The data-contained information query request frame includes the address of the communications device and the address of the first device, so that the communications device responds to the data-contained information query request frame when receiving the data-contained information query request frame.

The foregoing "being correct" refers to that the verification code obtained after the inverse computation is verified, and the verification succeeds.

As an optional implementation manner, the data-excluded information query request frame may further include the address of the first device, and the data-excluded information query response frame may further include the address of the first device. However, in this implementation manner, because the data-excluded information query request frame includes only the first control information, the first hash value, the address of the first device, and the verification code. The data-excluded information query response frame includes only the second control information, the first hash value, the address of the first device, the address of the communications device, and the verification code, compared with an implementation manner in the prior art, utilization of network resources can also be improved. A location, in the data-excluded information query request frame, of the content included in the data-excluded information query request frame may not be limited, and a location, in the data-excluded information query response frame, of the content included in the data-excluded information query response frame may not be limited.

It should be noted that, the foregoing multiple optional implementation manners may be combined together for implementation. The first device may be the first device described in the foregoing method embodiments, and the communications device may be the second device described in the foregoing method embodiments.

In the foregoing technical solution, a data-excluded information query request frame includes only first control information and a first hash value, and the data-excluded information query response frame includes only second control information, a second hash value, and an address of a communications device. When a first device acquires the data-excluded information query response frame, the first device sends a data-contained information query request frame to the communications device when the first device determines that a third hash value is consistent with the second hash value. The data-contained information query request frame includes the address of the communications device and an address of the first device, so that the communications device responds to the data-contained information query request frame when receiving the data-contained information query request frame. In this embodiment of the present disclosure, the data-excluded information query request frame and the data-excluded information query response frame are shorter than a frame in the prior art, so that few network resources are occupied for a query, and utilization of the network resources is high.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

The foregoing disclosures are merely exemplary embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. An information query method, comprising:
sending, by a first device, a data-excluded information query request frame, the data-excluded information query request frame comprising first control information and a first hash value, the first hash value comprising a hash value generated by applying a first hash function to first information, the data-excluded information query request frame not comprising a target address, the first control information comprising at least first indication information for indicating a type of the data-excluded information query request frame, and the data-excluded information query request frame comprising a first Media Access Control (MAC) frame that does not have a frame body and that only has a first frame header and a first verification code;
receiving, by the first device, a data-excluded information query response frame from a second device, the data-excluded information query response frame comprising second control information, a second hash value, and an address of the second device, the second hash value comprising a hash value generated after the second device applies a second hash function to second information, the data-excluded information query response frame not comprising a target address, the second control information comprising at least second indication information for indicating the type of the data-excluded information query request frame, and the data-excluded information query response frame comprising a second MAC frame that does not have the frame body and that only has a second frame header and a second verification code;
performing, by the first device, inverse computation on computation information to obtain computational result, the computation information comprising an address of the first device and the second verification code of the second device;
sending, by the first device, a data-contained information query request frame to the second device when the first device determines that the inverse computation on the computation information is successful and that a third hash value is consistent with the second hash value, the third hash value being consistent with the second hash value indicating that the second device is a device that the first device needs to query, the third hash value being generated by applying the second hash function to the first information, and the data-contained information query request frame comprising the address of the second device and the address of the first device.

2. The method of claim 1, wherein the second information refers to information whose hash value generated after the information is computed using the first hash function is consistent with the first hash value.

3. The method of claim 1, wherein the data-excluded information query response frame comprises multiple second hash values, and determining, by the first device, that the third hash value is consistent with the second hash value comprises determining, by the first device, that the third hash value is consistent with at least one second hash value in the multiple second hash values.

4. The method of claim 1, wherein the type of the data-excluded information query request frame comprises a request type or a neutral type, and the type of the data-excluded information query response frame comprises a publication type or a neutral type.

5. The method of claim 1, wherein the data-excluded information query request frame further carries third indication information for indicating a property of the first hash value, the data-excluded information query response frame further carrying fourth indication information for indicating a property of the second hash value, the property of the first hash value being a request property or a neutral property, and the property of the second hash value comprising a publication property or a neutral property.

6. An information query method, comprising:
acquiring, by a second device, a data-excluded information query request frame from a first device, the data-excluded information query request comprising first control information and a first hash value, the first hash value comprising a hash value generated by applying a first hash function to first information, the data-excluded information query request frame not comprising a target address, the first control information comprising at least first indication information for indicating a type of the data-excluded information query request frame, and the data-excluded information query request frame comprising a first Media Access Control (MAC) frame that does not have a frame body and that only has a first frame header and a first verification code;
sending, by the second device, a data-excluded information query response frame When the second device has second information corresponding to the first hash value, the data-excluded information query response frame comprising second control information, a second hash value, and an address of the second device, a third hash value from the first device being consistent with the second hash value indicating that the second device is a device that the first device needs to query, the third hash value being a hash value generated after the first device applies a second hash function to the first information, a data-contained information query request frame from the first device comprises the address of the second device and an address of the first device, the second hash value being a hash value generated after the second device applies the second hash function to the second information, the data-excluded information query response frame not comprising a target address, the second control information comprising at least second indication information for indicating the type of the data-excluded information query request frame, the data-excluded information query response frame comprising a second MAC frame that does not have the frame body and that only has a second frame header and a second verification code, and the data-excluded information query response frame comprising computation information comprising the address of the first device and the second verification code of the second device; and
responding, by the second device, to the data-contained information query request frame when receiving the data-contained information query request frame and when a computational result obtained by performing inverse computation on the computation information is successful.

7. The method of claim 6, wherein the second information refers to information whose hash value generated after the information is computed using the first hash function is consistent with the first hash value.

8. The method of claim 6, wherein the data-excluded information query request frame further carries third indication information for indicating a property of the first hash value, the data-excluded information query response frame further carrying fourth indication information for indicating a property of the second hash value, the property of the first hash value comprising a request property or a neutral property, and the property of the second hash value comprising a publication property or a neutral property.

9. The method of claim 6, wherein the data-excluded information query request frame does not comprise a transmit address, and the data-excluded information query response frame does not comprise the transmit address.

10. A communications device, comprising:
a transmitter configured to send a data-excluded information query request frame, the data-excluded information query request frame comprising first control information and a first hash value, the first hash value comprising a hash value generated by applying a first hash function to first information, the data-excluded information query request frame not comprising a target address, the first control information comprising at least first indication information for indicating a type of the data-excluded information query request frame, and the data-excluded information query request frame comprising a first Media Access Control (MAC) frame that does not have a frame body and that only has a first frame header and a first verification code;
a receiver configured to receive a data-excluded information query response frame from a second device, the data-excluded information query response frame comprising second control information, a second hash value, and an address of the second device, the second hash value comprising a hash value generated after the second device applies a second hash function to second information, the data-excluded information query response frame not comprising a target address, the second control information comprising at least second indication information for indicating the type of the data-excluded information query request frame, and the data-excluded information query response frame comprising a second MAC frame that does not have the frame body and that only has a second frame header and a second verification code; and
a processor separately coupled with the transmitter and the receiver, the processor being configured to:
parse the data-excluded information query response frame received by the receiver, to obtain the second hash value;
perform inverse computation on computation information to obtain a computational result, the computation information comprising an address of the communication device and the second verification code of the second device; and
determine whether a third hash value is consistent with the second hash value, the third hash value being consistent with the second hash value indicating that the second device is a device that the communications device needs to query, the third hash value being a hash value generated by applying the second hash function to the first information, the transmitter being further configured to send a data-contained information query request frame to the second device when the processor determines that the inverse computation on the computation information is successful and that the third hash value is consistent with the second hash value, and the data-contained information query request frame comprising the address of the second device and the address of the communications device.

11. The device of claim 10, wherein the second information refers to information whose hash value generated after the information is computed using the first hash function is consistent with the first hash value.

12. The device of claim 10, wherein the data-excluded information query response frame comprises multiple second hash values, and the processor is further configured to determine whether the third hash value is consistent with at least one second hash value in the multiple second hash values.

13. The device of claim 10, wherein the type of the data-excluded information query request frame comprises a request type or a neutral type, and the type of the data-excluded information query response frame comprises a publication type or a neutral type.

14. The device of claim 10, wherein the data-excluded information query request frame further carries third indication information for indicating a property of the first hash value, the data-excluded information query response frame further carries fourth indication information for indicating a property of the second hash value, the property of the first hash value is a request property or a neutral property, and the property of the second hash value is a publication property or a neutral property.

15. A communications device, comprising:
a receiver configured to acquire a data-excluded information query request frame from a first device, the data-excluded information query comprising first control information and a first hash value, the first hash value being a hash value generated by applying a first hash function to first information, the data-excluded information query request frame not comprising a target address, the first control information comprising at least first indication information for indicating a type of the data-excluded information query request frame, and the data-excluded information query request frame comprising a first Media Access Control (MAC) frame that does not have a frame body and that only has a first frame header and a first verification code;
a processor coupled to the receiver, the processor being configured to:
parse the data-excluded information query request frame received by the receiver, to obtain the first hash value; and
determine whether the communications device has second information corresponding to the first hash value; and
a transmitter coupled to the processor and configured to send a data-excluded information query response frame when the processor determines that the communications device has the second information corresponding to the first hash value, the data-excluded information query response frame comprising second control information, a second hash value, and an address of the communications device, a data-excluded information query response frame comprising a second MAC frame that does not have the frame body and that only has a second frame header and a second verification code, a third hash value being consistent with the second hash value indicating that the communications device is a device that the first device needs to query, the third hash value is a hash value generated by applying the second hash function to the first information, the data-contained information query request frame comprising the address of the communications device and an address of the first device, the second hash value comprising a hash value generated after the processor applies the second hash function to the second information, the data-excluded information query response frame not comprising a target address, and the second control information comprising at least second indication information for indicating the type of the data-excluded information query request frame, and the processor being further configured to respond to the data-contained information query request frame when a computational result obtained by performing inverse computation on computation information is successful and when the data-contained information query request frame is received, and the data-excluded query response frame comprising the computation information comprising the address of the first device and the second verification code of the second device.

16. The device of claim 15, wherein the second information refers to information whose hash value generated after the information is computed using the first hash function is consistent with the first hash value.

17. The device of claim 15, wherein the type of the data-excluded information query request frame comprises a request type or a neutral type, and the type of the data-excluded information query response frame comprises a publication type or a neutral type.

18. The device of claim 15, wherein the data-excluded information query request frame further carries third indication information for indicating a property of the first hash value, the data-excluded information query response frame further carrying fourth indication information for indicating a property of the second hash value, the property of the first hash value is a request property or a neutral property, and the property of the second hash value is a publication property or a neutral property.

* * * * *

UNITED STATES PATENT AND TRADEMARK OFFICE
CERTIFICATE OF CORRECTION

PATENT NO. : 10,104,530 B2  
APPLICATION NO. : 14/889783  
DATED : October 16, 2018  
INVENTOR(S) : Ji Chen, Zhiming Ding and Zhenguo Du Page 1 of 1

It is certified that error appears in the above-identified patent and that said Letters Patent is hereby corrected as shown below:

In the Claims

Column 53, Line 48 Claim 1: "obtain computational" should read "obtain a computational"

Column 54, Line 38 Claim 6: "When" should read "when"

Signed and Sealed this  
Fourth Day of December, 2018

Andrei Iancu  
*Director of the United States Patent and Trademark Office*